US010294966B2

United States Patent
Asai et al.

(10) Patent No.: US 10,294,966 B2
(45) Date of Patent: May 21, 2019

(54) ACTUATOR BODY, METHOD FOR DRIVING ACTUATOR, AND GRIPPING HAND USING THE SAME

(71) Applicant: Panasonic Intellectual Property Management Co., Ltd., Osaka (JP)

(72) Inventors: Katsuhiko Asai, Nara (JP); Jun Ozawa, Nara (JP); Takayuki Nagata, Osaka (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 15/641,056

(22) Filed: Jul. 3, 2017

(65) Prior Publication Data
US 2018/0017088 A1 Jan. 18, 2018

(30) Foreign Application Priority Data
Jul. 13, 2016 (JP) .................... 2016-138502

(51) Int. Cl.
*F15B 15/10* (2006.01)
*B25J 15/12* (2006.01)
*B25J 15/00* (2006.01)

(52) U.S. Cl.
CPC .............. *F15B 15/10* (2013.01); *B25J 15/12* (2013.01); *F15B 15/103* (2013.01); *B25J 15/0023* (2013.01)

(58) Field of Classification Search
CPC .................... B25J 15/0023; F15B 15/103
See application file for complete search history.

(56) References Cited

U.S. PATENT DOCUMENTS 3,561,330 A * 2/1971 Rich .................. B25B 5/061
                                       294/119.3
3,981,528 A * 9/1976 Andorf ............. B25J 15/0023
                                       294/119.3

FOREIGN PATENT DOCUMENTS

JP        59-197605        11/1984

OTHER PUBLICATIONS

Daisuke Sasaki et al., "Development of Power Assist Glove using Pneumatic Artificial Rubber Muscle", Journal of the Robotics Society of Japan, vol. 24. No. 5, pp. 640-646, Jul. 2006 (Whole sentence Translation).

* cited by examiner

*Primary Examiner* — F Daniel Lopez
(74) *Attorney, Agent, or Firm* — Wenderoth, Lind & Ponack, L.L.P.

(57) ABSTRACT

An actuator body includes a tube that has a space therein and is wound spirally about a first axis. The tube has a plurality of first portions and a plurality of second portions, the tube has one or more grooves in at least one of an outer circumferential surface and an inner circumferential surface thereof, and the one or more grooves are provided spirally about a longitudinal axis of the tube, the space is in contact with the inner circumferential surface, and the outer circumferential surface is a surface opposite to the inner circumferential surface, each of the plurality of first portions has higher torsional rigidity than each of the plurality of second portions, the plurality of first portions are aligned along the first axis, and the plurality of first portions do not overlap the plurality of second portions.

18 Claims, 17 Drawing Sheets

EXTERNAL FORCE

ACTUATOR BODY, METHOD FOR DRIVING ACTUATOR, AND GRIPPING HAND USING THE SAME

BACKGROUND

1. Technical Field

The present disclosure relates to an actuator body used in an actuator that converts pressure of fluid into a change in degree of flexion, a method for driving the actuator, and a gripping hand using the actuator.

2. Description of the Related Art

Along with increasing demands for a machine, such as a household robot, that works close to humans, there are increasing expectations for an artificial muscle actuator having light-weight and flexible characteristics like human muscles. Although there are various kinds of artificial muscle actuators, most of them are actuators that utilize deformation of a rubber-like elastic material that is compatible with the light-weight and flexible characteristics.

As one of the actuators that utilize deformation of a rubber-like elastic material, a McKibben-type actuator that stretches and contracts due to pressure of fluid is known (see, for example, Japanese Unexamined Patent Application Publication No. 59-197605).

The McKibben-type actuator described in Japanese Unexamined Patent Application Publication No. 59-197605 is constituted by a rubber tube that is reinforced by a braided structure. This actuator is stretched or contracted by converting radial expansion into axial contraction while pressurizing the inside of the rubber tube and thus changing an angle of braid like a pantograph. Furthermore, it is known that an actuator that makes a flexion action can be provided by making it hard for one surface of the actuator to stretch and contract in an axial direction (see, for example, Daisuke Sasaki et al. "Development of Power Assist Glove using Pneumatic Artificial Rubber Muscle", Journal of the Robotics Society of Japan, Vol. 24. No. 5, pp. 640-646, 2006).

However, a McKibben-type actuator, which is stretched or contracted in an axial direction by increasing or decreasing fluid pressure therein, is undesirably inhibited from freely moving in a bending direction during application of pressure to the inside of the rubber tube. Therefore, an actuator that makes a flexion action is also undesirably inhibited from being freely bent in a direction other than a flexion direction during application of pressure.

SUMMARY

One non-limiting and exemplary embodiment provides an actuator body and a method for driving an actuator that allow an actuator to make a flexion action and to freely bend in a direction other than a flexion direction.

In one general aspect, the techniques disclosed here feature an actuator body including a tube that has a space therein and is wound spirally about a first axis; wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein each of the plurality of first portions has higher torsional rigidity than each of the plurality of second portions, wherein the plurality of first portions are aligned along the first axis, and wherein the plurality of first portions do not overlap the plurality of second portions.

The actuator body according to the present disclosure allows an actuator to make a flexion action and to freely bend in a direction other than a flexion direction.

It should be noted that general or specific embodiments may be implemented as a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
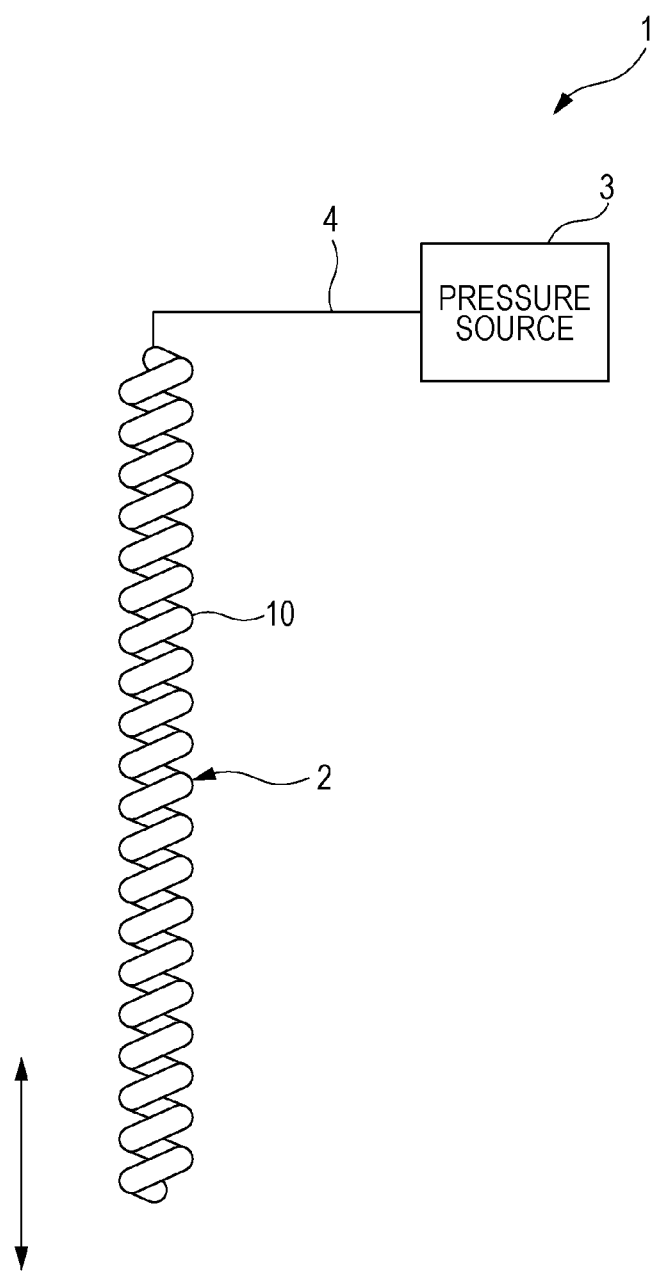
FIG. 1 schematically illustrates an actuator having an actuator body according to Embodiment 1.

Underlying Knowledge Forming Basis of the Present Disclosure

The inventor of the present invention found that the following problem occurs in the McKibben-type flexion actuator described in BACKGROUND.

A McKibben-type actuator, which is constituted by a rubber tube, originally has flexibility in a bending direction, but the flexibility decreases and rigidity against flexion increases as the internal pressure of the rubber tube increases. The increase in flexural rigidity is considered to be caused because bending an actuator causes a change in inner volume of an inner space of the rubber tube. In order to bend an actuator, it is necessary to compress fluid in the inner space and generate deformation according to compression force in the rubber tube, and force needed for bending increases as the pressure in the inner space increases. This characteristic also applies to a flexion-action actuator having one surface that is hard to stretch and contract in an axial direction. Specifically, flexural rigidity in a direction other than a flexion direction increases as internal pressure in a rubber tube increases.

This characteristic is useful, for example, for an object gripping action utilizing flexural rigidity but poses a problem, for example, in a case where such an actuator is provided in a glove-like assist wear. Specifically, in a case where such actuators are attached so as to flex along fingers, application of pressure to fluid for the purpose of flexing the actuators generates assist force in a flexion direction and increases rigidity in a direction in which the fingers are spread. Accordingly, the actuators can assist force in the flexion direction but undesirably inhibits free movement in the direction in which the fingers are spread.

In order to solve such a problem, an actuator body according to as aspect of the present disclosure includes a tube that has a space therein and is wound spirally about a first axis; wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein each of the plurality of first portions has higher torsional rigidity than each of the plurality of second portions, wherein the plurality of first portions are aligned along the first axis, and wherein the plurality of first portions do not overlap the plurality of second portions.

According to this configuration, in a case where the hollow part of the tube is filled with fluid and pressure of the fluid is changed, the tube is elastically deformed outward or inward so as to be twisted along the spiral of the grooves of the tube. The twist allows the actuator body that is wound spirally to stretch or contract. Furthermore, each of the first portions of the tube has higher torsional rigidity than each of the second portions, and the plurality of first portions are aligned along a central axis of the spiral. This makes stretch or contraction of the actuator body uneven, thereby causing the whole actuator body to make a flexion action. Furthermore, in a case where external force is applied in a direction in which the actuator body is bent, there are a portion where the inner volume of the tube increases due to twist of the tube in a predetermined direction and a portion where the inner volume of the tube decreases due to twist of the tube in a reverse direction. This reduces a change in inner volume of the tube as a whole, thereby making it possible to easily bend the actuator body.

In an embodiment, an actuator body includes a tube that has a space therein and is wound spirally about a first axis; wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein a thickness of the tube at each of the plurality of first portions is larger than a thickness of the tube at each of the plurality of second portions, wherein the plurality of first portions are aligned along the first axis, and wherein the plurality of first portions do not overlap the plurality of second portions.

According to this configuration, the thickness of each of the first portions is larger than that of each of the second portions, and torsional rigidity of each of the first portions of the tube is made higher in accordance with this increase in thickness. This makes a difference in twist of the tube larger in a case where pressure of fluid is changed, thereby causing the actuator body to more easily flex. Meanwhile, a bending action in a direction other than a flexion direction is not affected, and the actuator body remains easy to bend.

In an embodiment, an actuator body includes a tube that has a space therein and is wound spirally about a first axis; wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein a width between the grooves at each of the plurality of first portions is larger than a width between the grooves at each of the plurality of second portions, wherein the plurality of first portions are aligned along the first axis, and wherein the plurality of first portions do not overlap the plurality of second portions.

According to this configuration, a width between the grooves at each of the first portion is larger than a width between the grooves at each of the second portions, and torsional rigidity of each of the first portions of the tube is made higher in accordance with this increase in width. This makes a difference in twist of the tube larger in a case where pressure of fluid is changed, thereby causing the actuator body to more easily flex. Meanwhile, a bending action in a direction other than a flexion direction is not affected, and the actuator body remains easy to bend.

In an embodiment, an actuator body includes a tube that has a space therein and is wound spirally about a first axis; wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein a spiral pitch of the one or more grooves in each of the plurality of first portions larger than a spiral pitch of the one or more grooves in each of the plurality of second portions, wherein the plurality of first portions are aligned along the first axis, and wherein the plurality of first portions do not overlap the plurality of second portions.

According to this configuration, a spiral pitch of the grooves at each of the first portions is larger than a spiral pitch of the grooves at each of the second portions, the number of turns of the spiral is made smaller and torsional rigidity of each of the first portions of the tube is made higher in accordance with this increase in spiral pitch. This makes a difference in twist of the tube larger in a case where pressure of fluid is changed, thereby causing the actuator body to more easily flex. Meanwhile, a bending action in a direction other than a flexion direction is not affected, and the actuator body remains easy to bend.

For example, the actuator body may be configured such that the tube includes a cylindrical first elastic member and a cylindrical second elastic member that is disposed on an inner side or an outer side of the first elastic member and that is more flexible than the first elastic member; the one or more grooves are formed by a through-hole that passes through an inner circumferential surface of the first elastic member and an outer circumferential surface of the first elastic member and part of a surface of the second elastic member; and the through-hole forms a first opening in the inner circumferential surface and a second opening in the outer circumferential surface, and the part of the surface blocks the first opening or the second opening.

According to this configuration, the first elastic member having the through-hole is more easily twisted, and therefore the tube can be twisted with certainty. This allows the actuator body to make a flexion action with certainty and to be easily bent in a direction other than a flexion direction.

For example, the actuator body may be configured such that the first elastic member has a spiral skeletal portion located between adjacent two of the grooves that are adjacent to each other in a circumferential direction of the first elastic member; and a thickness of the skeletal portion is smaller than a width of the skeletal portion.

According to this configuration, in a case where the hollow part of the tube is filled with fluid and pressure of the fluid is changed, the first elastic member is easily deformed outward or inward, and the tube is easily twisted accordingly. This allows the actuator body to easily make a flexion action and to be easily bent in a direction other than a flexion direction.

For example, the actuator body may be configured such that a spiral pitch of the one or more grooves is larger than an outer circumferential length of the first elastic member.

According to this configuration, outward or inward deformation of the first elastic member is more easily converted into twist of the tube, and the actuator body more easily makes a flexion action accordingly.

For example, the actuator body may be configured such that the first elastic member is located on an outer side of the second elastic member, and an edge line formed by the inner circumferential surface of the first elastic member and a side surface of the through-hole is chamfered; and the side surface is included in the first elastic member and is located between the first opening and the second opening.

According to this configuration, it is possible to mitigate concentration of stress on the edge line formed by the inner circumferential surface of the first elastic member and the side surface of the groove in a case where the first elastic member and the second elastic member are elastically deformed outward or inward. This can make a flexion action of the actuator body or a bending action of the actuator body in a direction other than a flexion direction smooth. Furthermore, it is possible to improve durability of the actuator body.

For example, the actuator body may be configured such that a distance between the first opening and the second opening is equal to or larger than a half of a thickness of the tube.

According to this configuration, a portion of the tube located on the bottom of the groove is thin and is easily deformed. This makes it easy for the tube to be elastically deformed outward or inward, thereby allowing the tube to be easily twisted. Accordingly, the actuator body easily makes a flexion action and is easily bent in a direction other than a flexion direction.

For example, the actuator body may be configured such that a spiral pitch of the one or more grooves is larger than an outer circumferential length of the tube.

According to this configuration, outward or inward deformation of the tube is more easily converted into twist of the tube, and the actuator body more easily makes a flexion action accordingly.

For example, the actuator body may be configured such that the one or more grooves are multiple grooves.

In a case where the one or more grooves are multiple grooves, the spiral pitch of the spiral grooves can be made larger. Accordingly, outward or inward deformation of the tube is more easily converted into twist of the tube, and the actuator body more easily makes a flexion action accordingly.

For example, the actuator body may be configured such that each of the one or more grooves has a constant width.

According to this configuration, load applied to the tube is well-balanced. This can make a flexion action of the actuator body or a bending action of the actuator body in a direction other than a flexion direction smooth. Furthermore, it is possible to improve durability of the actuator body.

In order to solve the above problem, an actuator body according to another aspect of the present disclosure includes a tube that has a space therein and is wound spirally about a first axis; wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about a longitudinal axis of the tube, wherein the space is in contact with the inner circumferential surface, and the outer circumferential surface is a surface opposite to the inner circumferential surface, wherein the second elastic member is provided in the one or more through-holes, wherein each of the plurality of first portions has higher torsional rigidity than each of the plurality of second portions, wherein the plurality of first portions are aligned along the first axis, and wherein the plurality of first portions do not overlap the plurality of second portions.

According to this configuration, in a case where the hollow part of the tube is filled with fluid and pressure of the fluid is changed, the tube is elastically deformed outward or inward so as to be twisted along the spiral of the through-holes of the first elastic member. The twist allows the actuator body that is wound spirally to make a flexion action. Furthermore, in a case where external force is applied in a direction in which the actuator body is bent other than a flexion direction, there are a portion where the inner volume of the tube increases due to twist of the tube in a predetermined direction and a portion where the inner volume of the tube decreases due to twist of the tube in a reverse direction. This reduces a change in inner volume of the tube as a whole, thereby making it possible to easily bend the actuator body. Furthermore, the tube can be made thin, and the actuator body can be reduced in size.

In an embodiment, an actuator body includes a tube that has a space therein and is wound spirally about a first axis: wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about a longitudinal axis of the tube, wherein the space is in contact with the inner circumferential surface, and the outer circumferential surface is a surface opposite to the inner circumferential surface, wherein the second elastic member is provided in the one or more through-holes, wherein a thickness of the tube at each of the plurality of first portions is larger than a thickness of the tube at each of the plurality of second portions, wherein the plurality of first portions are aligned along the first axis, and wherein the plurality of first portions do not overlap the plurality of second portions.

According to this configuration, the thickness of each of the first portions is larger than that of each of the second portions, and torsional rigidity of each of the first portions of the tube is made higher in accordance with this increase in thickness. This makes a difference in twist of the tube larger in a case where pressure of fluid is changed, thereby causing the actuator body to more easily flex. Meanwhile, a bending action in a direction other than a flexion direction is not affected, and the actuator body remains easy to bend.

In an embodiment, an actuator body includes a tube that has a space therein and is wound spirally about a first axis; wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about a longitudinal axis of the tube, wherein the space is in contact with the inner circumferential surface, and the outer circumferential surface is a surface opposite to the inner circumferential surface, wherein the second elastic member is provided in the one or more through-holes, wherein a width between the one or more through-holes at each of the plurality of first portions is larger than a width between the one or more through-holes at each of the plurality of second portions, wherein the plurality of first portions are aligned along the first axis, and wherein the plurality of first portions do not overlap the plurality of second portions.

According to this configuration, a width between the through-holes at each of the first portion is larger than a width between the through-holes at each of the second portions, and torsional rigidity of each of the first portions of the tube is made higher in accordance with this increase in width. This makes a difference in twist of the tube larger in a case where pressure of fluid is changed, thereby causing the actuator body to more easily flex. Meanwhile, a bending action in a direction other than a flexion direction is not affected, and the actuator body remains easy to bend.

In an embodiment, an actuator body includes a tube that has a space therein and is wound spirally about a first axis; wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about an axial center of the tube, wherein the space is in contact with the inner circumferential surface, and the outer circumferential surface is a surface opposite to the inner circumferential surface, wherein the second elastic member is provided in the one or more through-holes, wherein a spiral pitch of the one or more through-holes at each of the plurality of first portions is larger than a spiral pitch of the one or more through-holes at each of the plurality of second portions, wherein the plurality of first portions are aligned along the first axis, and wherein the plurality of first portions do not overlap the plurality of second portions.

According to this configuration, a spiral pitch between the through-holes at each of the first portions is larger than a spiral pitch between the through-holes at each of the second portions, and the number of turns of the spiral is made smaller and torsional rigidity of each of the first portions of the tube is made higher in accordance with this increase in spiral pitch. This makes a difference in twist of the tube larger in a case where pressure of fluid is changed, thereby causing the actuator body to more easily flex. Meanwhile, a bending action in a direction other than a flexion direction is not affected, and the actuator body remains easy to bend.

In order to solve the above problem, a method for controlling an actuator body according to the present disclosure includes receiving, by a controller, an instruction signal; and increasing or decreasing, by the controller, pressure of fluid in accordance with the instruction signal, the actuator body including a tube that has a space therein and is wound spirally about a first axis; wherein the tube has a plurality of first portions and a plurality of second portions, wherein the tube has one or more grooves in at least one of an outer circumferential surface and an inner circumferential surface thereof, wherein the one or more grooves are provided spirally about a longitudinal axis of the tube, wherein the space is in contact with the inner circumferential surface, and the outer circumferential surface is a surface opposite to the inner circumferential surface, wherein each of the plurality of first portions has higher torsional rigidity than each of the plurality of second portions, wherein the plurality of first portions are aligned along the first axis, wherein the plurality of first portions do not overlap the plurality of second portions; and wherein the tube is filled with the fluid.

According to this arrangement, the actuator body can be flexed with certainty.

In an embodiment, a gripping hand is a gripping hand using actuator bodies that convert pressure of fluid into a change of a degree of flexion, the gripping hand including a plurality of actuator bodies, each of the plurality of actuator bodies including a hollow elastic tube that is wound spirally; wherein the tube has a plurality of first portions and a plurality of second portions, wherein the tube has one or more grooves in at least one of an outer circumferential surface and an inner circumferential surface thereof, and the one or more grooves are provided spirally about an axial center of the tube, wherein each of the plurality of first portions has higher torsional rigidity than each of the plurality of second portions; wherein the plurality of first portions are aligned along a central axis of the spiral, and wherein the gripping hand uses the plurality of actuator bodies as gripping tools.

According to the gripping hand having this configuration, an object can be gripped by using the actuator bodies that make a flexion action.

It should be noted that general or specific aspects may be implemented as a system, or any selective combination thereof.

Embodiments are described below with reference to the drawings.

Each of the embodiments described below illustrates a general or specific example. Numerical values, shapes, materials, constituent elements, the way in which the constituent elements are disposed and connected, steps, the order of steps, and the like in the embodiments below are examples and do not limit the present disclosure. Among constituent elements in the embodiments below, constituent elements that are not described in independent claims indicating highest concepts are described as optional constituent elements.

Embodiment 1

First, an overall configuration of an actuator 1 is described with reference to FIG. 1. The actuator 1 converts pressure of fluid into a change of a degree of flexion and includes an actuator body 2, a pressure source 3, and a pipe 4.

The actuator body 2 is shaped so that a hollow tube 10 is wound spirally. The tube 10 is filled with fluid such as water. An upper part of the actuator body 2 is fixed to a fixing tool (not illustrated), and an upper end of the actuator body 2 is connected to the pipe 4. A lower end of the actuator body 2 is sealed, for example, by caulking. A configuration of the actuator body 2 will be described in detail later.

The pressure source 3 brings fluid into and out of the actuator body 2 through the pipe 4 and thereby increases and decreases pressure in the tube 10 of the actuator body 2 and stretches and contracts the actuator body 2.

As the pressure source 3, for example, a syringe pump (reciprocating pump) is used. The syringe pump is a pump that has an injector-like cylindrical syringe, a movable plunger, and a control unit that controls the position of the plunger. The syringe pump sends out the fluid by pressurizing the inside of the syringe by using the plunger and collects the fluid by depressurizing the inside of the syringe. By causing the syringe pump to operate, it is possible to adjust the amount and pressure of fluid with which the tube 10 of the actuator body 2 is filled. A computer (not illustrated) may transmit an instruction signal for determining the position of the plunger to the control unit. The control unit may increase or decrease the pressure of the fluid by changing the position of the plunger in accordance with the received instruction signal.

The pipe 4 is a tube-like member that connects the pressure source 3 and the actuator body 2 and serves as a passage for outflow and inflow of the fluid. In a case where the pressure source 3 and the actuator body 2 are directly connected, it is unnecessary to use the pipe 4. The pipe 4 may branch so that a plurality of actuator bodies 2 are connected to the single pressure source 3.

Next, the actuator body 2 according to the present embodiment is described.

Figure 2:
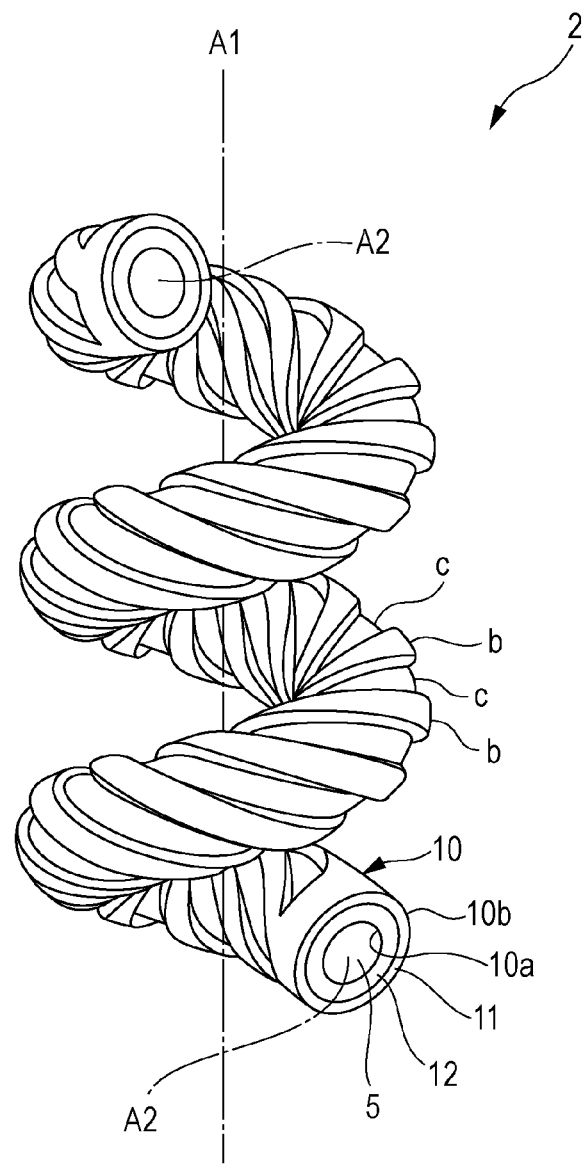
FIG. 2 illustrates part of a tube of the actuator body according to Embodiment 1.
Figure 3:
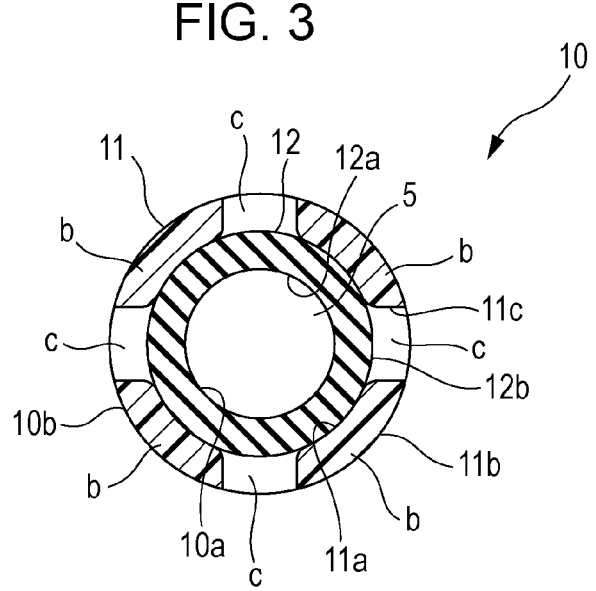
FIG. 3 is a transverse cross-sectional view of the tube of the actuator body according to Embodiment 1.

FIG. 2 illustrates part of the tube 10 of the actuator body 2, and FIG. 3 is a transverse cross-sectional view of the tube 10 of the actuator body 2.

The actuator body 2 is shaped so that the hollow tube 10 having elasticity is wound spirally. The tube 10 is wound about an axis A1 extending in a direction of a long axis of the actuator body 2. A plurality of grooves c are spirally provided about an axial center A2 of the tube 10 in an outer circumferential surface 10b of the tube 10. In the present embodiment, the spiral of the tube 10 is wound clockwise with respect to the axis A1, and the spiral of the grooves c is wound clockwise with respect to the axial center A2. That is, the spiral of the tube 10 and the spiral of the grooves c are wound in the same direction.

As illustrated in FIG. 3, the tube 10 includes a cylindrical first elastic member 11 and a cylindrical (pipe-like) second elastic member 12 that is more flexible than the first elastic member 11. The second elastic member 12 is hollow, and this hollow part (an inside of an inner circumferential surface 12a) is filled with fluid 5.

The first elastic member 11 has a plurality of through-holes 11c that pass through an inner circumferential surface 11a and an outer circumferential surface 11b thereof. The second elastic member 12 is disposed in contact with an inner side of the first elastic member 11 and blocks the through-holes 11c. Accordingly, the grooves c are formed by side surfaces of the through-holes 11c of the first elastic member 11 and a surface (an outer circumferential surface 12b) of the second elastic member 12. The first elastic member 11 and the second elastic member 12 are not adhered to each other.

The first elastic member 11 has a plurality of skeletal portions b each located between the grooves c adjacent in a circumferential direction. The skeletal portions b have an arc-like cross section and are spaced apart from each other in the circumferential direction. Four skeletal portions b are provided, and these skeletal portions b are wound spirally about the axial center A2, so that four grooves c are provided spirally.

The first elastic member 11 is disposed on an outer side of the second elastic member 12, and edge lines formed by the inner circumferential surface 11a of the first elastic member 11 and side surfaces of the grooves c (through-holes 11c) are chamfered. In the present embodiment, the edge lines are rounded but may be tapered.

As described above, a member that is more flexible than the first elastic member 11 is used as the second elastic member 12. Such a member that is flexible encompasses a member that is made of a soft material or a member that is structurally soft, for example, a thin or corrugated member that easily deforms.

In the present embodiment, nylon is used as a material of the first elastic member 11, and silicon rubber is used as a material of the second elastic member 12. Used materials are not limited to these materials, and various resin materials and/or various metal materials can be used. These elastic members 11 and 12 are selected as appropriate in consideration of needed pressure resistance, flexibility, resistance to the fluid 5 (chemical resistance, solvent resistance, oil resistance), and the like. For example, a light-weight actuator body 2 is obtained by using resin materials as the elastic members 11 and 12. Alternatively, in a case where engineering plastic having high rigidity and/or a metal material having high rigidity are used, the actuator body 2 can be operated at high pressure and low flow amount, and loss associated with flow of the fluid 5 can be reduced.

As the pipe 4 of the actuator 1, one that has higher pressure resistance than the elastic members 11 and 12 is used in order to increase response during operation of the actuator body 2.

Figure 4:
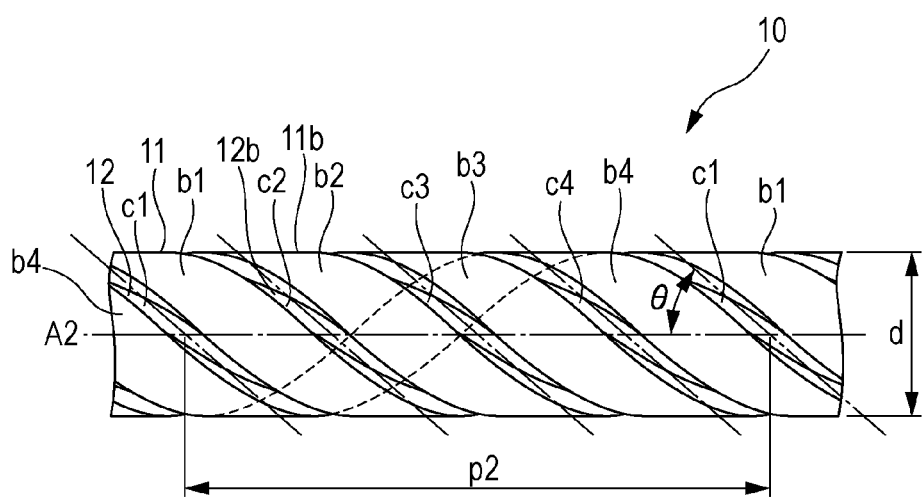
FIG. 4 is a front view illustrating the tube of the actuator body according to Embodiment 1 that is made straight.
Figure 5:
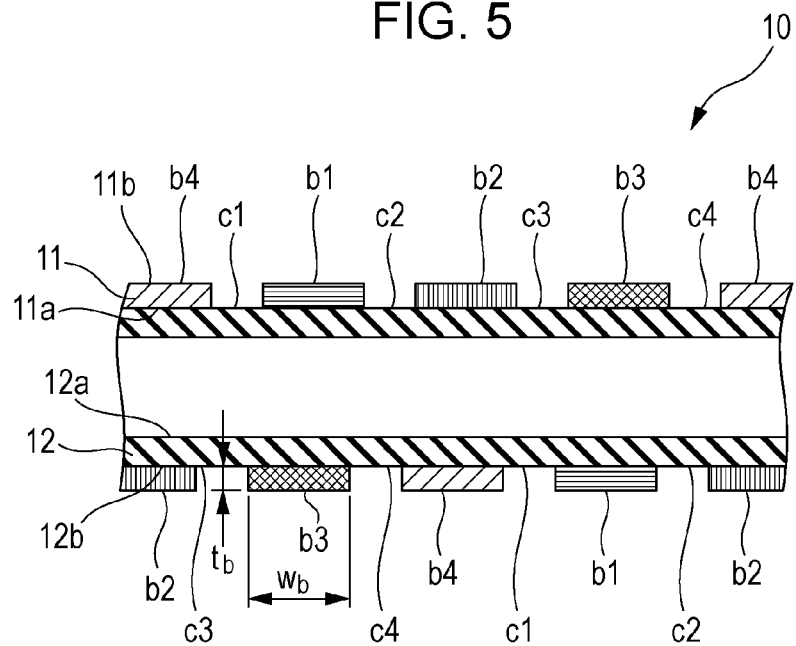
FIG. 5 is a longitudinal cross-sectional view of the tube illustrated in FIG. 4.

FIG. 4 illustrates the tube 10 of the actuator body 2 that is made straight, and FIG. 5 is a longitudinal cross-sectional view of the tube 10 illustrated in FIG. 4.

As illustrated in FIGS. 4 and 5, the tube 10 has a multi-groove structure. Specifically, the tube 10 has four grooves c (c1, c2, c3, and c4) and four skeletal portions b (b1, b2, b3, and b4). The grooves c1, c2, c3, and c4 are parallel with one another, and each of the grooves C1, c2, c3, and c4 has a constant width. An interval between adjacent grooves c (e.g., an interval between the grooves c1 and the grooves c2) is designed as appropriate in accordance with the number of grooves c. The skeletal portions b1, b2, b3, and b4 are also parallel with one another, and each of the grooves c1, c2, c3, and c4 has a thickness $t_b$ smaller than the width $w_b$ of each of the skeletal portions b.

The grooves c are provided so that an inclination θ with respect to the axial center A2 of the tube 10 is less than 45 degrees in a case where pressure applied by the fluid is 0. The tube 10 has a diameter d of 4 mm, and each of the grooves c has a spiral pitch p2 of 14.4 mm. By setting the inclination θ of the grooves c to less than 45 degrees, the spiral pitch p2 of each of the grooves c is set larger than an outer circumferential length πd of the tube 10 (an outer circumferential length of the first elastic member 11 in the present embodiment).

Figure 8A:
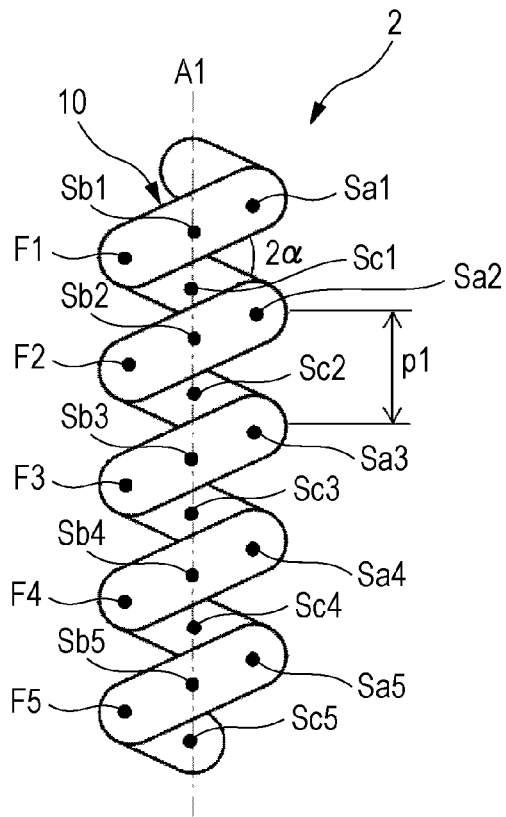
FIG. 8A is a schematic view illustrating the actuator body before application of pressure to fluid in the tube.
Figure 8B:
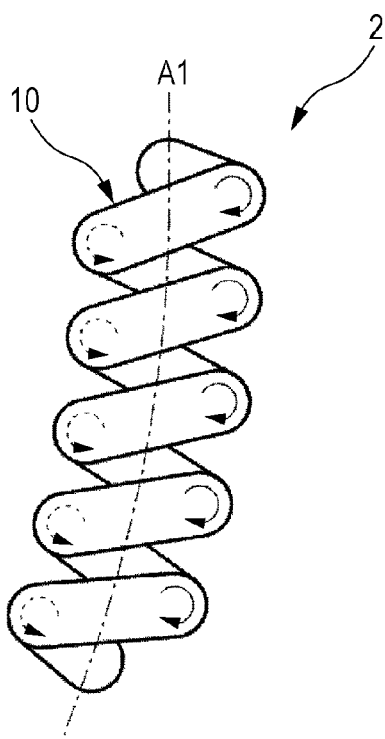
FIG. 8B is a schematic view illustrating flexion of the actuator body after application of pressure to fluid in the tube.

FIG. 8A is a schematic view illustrating the actuator body 2 before application of pressure to fluid in the tube. In the present embodiment, each turn of the spiral of the tube 10 that is wound spirally includes a first portion (F1, F2, F3, F4, or F5) having high torsional rigidity and a second portion (Sa1, Sa2, Sa3, Sa4, Sa5, Sb1, Sb2, Sb3, Sb4, Sb5, Sc1, Sc2, Sc3, Sc4, or Sc5) having torsional rigidity lower than the first portion, as illustrated in FIG. 8A. That is, the tube 10 has a plurality of first portions (F1, F2, F3, F4, and F5) and a plurality of second portions (Sa1, Sa2, Sa3, Sa4, Sa5, Sb1, Sb2, Sb3, Sb4, Sb5, Sc1, Sc2, Sc3, Sc4, and Sc5). Furthermore, as illustrated in FIG. 8A, the plurality of first portions (F1, F2, F3, F4, and F5) are aligned along a central axis of the spiral of the tube 10, i.e., along the axis A1 of the actuator body 2. Because of such a configuration, the actuator body 2 has higher torsional rigidity on the left side than on the right side in FIG. 8A, This causes the actuator body 2 to flex as illustrated in FIG. 8B when pressure is applied to the fluid. A method for driving the actuator 1 will be described later.

The tube 10 having such characteristics can be achieved, for example, by causing the skeletal portions b of the tube 10 to have different thicknesses.

Figure 9A:
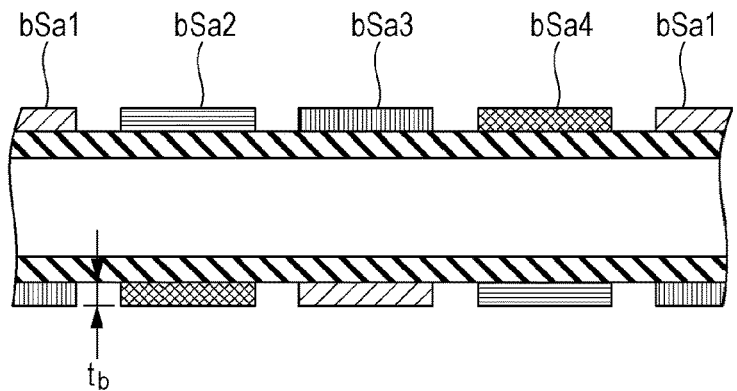
FIG. 9A is a longitudinal cross-sectional view illustrating a thickness of skeletal portions of the tube at a second portion in FIG. 8A.
Figure 9B:
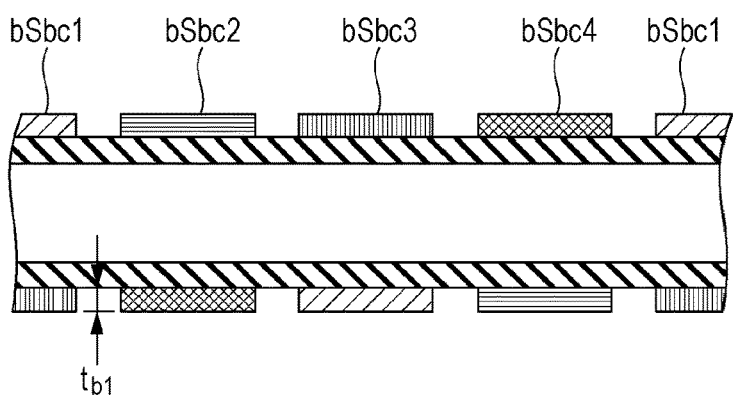
FIG. 9B is a longitudinal cross-sectional view illustrating a thickness of the skeletal portions of the tube at other second portions in FIG. 8A.

FIG. 9A is a longitudinal cross-sectional view illustrating a thickness of the skeletal portions of the tube at the second portion Sa1 in FIG. 8A. FIG. 9B is a longitudinal cross-sectional view illustrating a thickness of the skeletal portions of the tube at the second portions Sb1 and Sc1 in FIG. 8A. FIG. 9O is a longitudinal cross-sectional view illustrating a thickness of the skeletal portions of the tube at the first portion F1 in FIG. 8A.

For example, the torsional rigidity can be made higher at the first portion F1 than at the second portions Sa1, Sb1, and Sc1 by making a thickness $t_{b1}$ of skeletal portions bSbc1, bSbc2, bSbc3, and bSbc4 at the second portions Sb1 and Sc1 illustrated in FIG. 9B larger by 3% and making a thickness $t_{b2}$ of skeletal portions bF1, bF2, bF3, and bF4 at the first portion F1 illustrated in FIG. 9O larger by 26% than a thickness $t_b$ of skeletal portions bSa1, bSa2, bSa3, and bSa4 at the second portion Sa1 illustrated in 9A. Thicknesses of the skeletal portions b of each turn of the spiral of the tube 10 can be similar to those at the first portion F1 and the second portions Sa1, Sb1, and Sc1, In this case, the torsional rigidity of the first portion F1 is approximately two times as high as that of the second portion Sa1. Furthermore, the torsional rigidity gradually decreases away from the first portion F1 and reaches torsional rigidity that is not different from that of other portions at the position of ±45 degrees when viewed from the direction of the axis A1. As described above, such a method of changing the thickness can be employed as a method for increasing torsional rigidity.

The thickness of the skeletal portions b may be changed in any ways. The thickness of the skeletal portions b may be linearly changed or may be changed sinusoidally in accordance with a change of an angle. The thickness $t_{b1}$ of the skeletal portions bSbc1, bSbc2, bSbc3, and bSbc4 at the second portions Sb1 and Sc1 may be made the same as the thickness $t_b$ of the second portion Sa1, and the thickness may be changed between the second portions Sb1 and Sc1 and the second portion Sa1.

In a case where the same material is used, whether torsional rigidity is high or low can be determined on the basis of a difference in shape described above. However, for example, in a case where a change in shape different from that described above is employed and/or a case where different materials are used, an evaluation can be made by actual measurement. As an evaluation method using actual measurement, it is, for example, possible to evaluate rigidity of the F2 portion by holding an interval corresponding a single coil pitch between Sa2 and Sa3 in FIG. 8A and finding a relationship between force and deformation while increasing or decreasing the interval. A rigidity distribution can be evaluated by conducting a similar evaluation throughout the whole tube 10. In a case where a change in rigidity is periodic, an evaluation may be made collectively for several coil pitches. It is also possible to divide the tube 10 and directly evaluate rigidity by adding torsional torque to each part.

Next, a method for driving the actuator 1 is schematically described.

Figure 6:
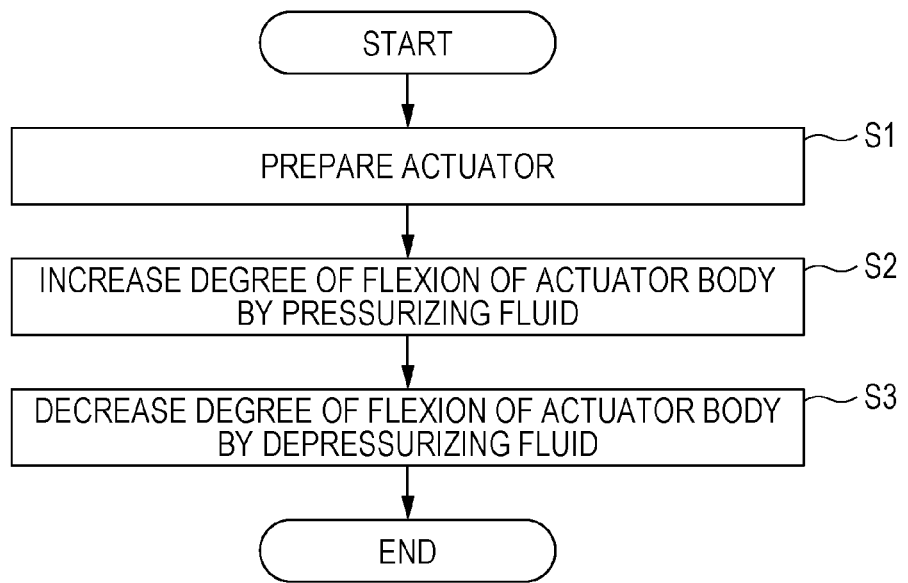
FIG. 6 is a flowchart illustrating a method for driving the actuator.

FIG. 6 is a flowchart illustrating a method for driving the actuator 1. FIGS. 8A and 8B are schematic views illustrating flexion of the actuator body 2. In FIGS. 8A and 8B, illustration of the grooves c is omitted.

The method for driving the actuator includes a step (a) of preparing the actuator 1 and a step (b) of increasing or decreasing a degree of flexion of the actuator body 2 (a degree of flexion of the axis A1).

The actuator 1 is prepared, and the actuator body 2 is in a steady state as illustrated in FIG. 8A before application of pressure to the fluid 5 in the tube 10 (S1 in FIG. 6). The steady state is a state where preload is applied to the fluid 5 in the tube 10. In this state, the degree of flexion of the actuator body 2 is one obtained by adding flexion caused by the preload and deformation caused by external force to a natural degree of flexion.

In the state illustrated in FIG. 8A, for example, pressure of 0.5 MPa is applied to the fluid 5 by using the pressure source 3, and thus the fluid 5 is further supplied into the tube 10 of the actuator body 2. In this way, the degree of flexion of the axis A1 of the actuator body 2 is increased as illustrated in FIG. 8B (S2 of FIG. 6).

Then, the degree of flexion of the axis A1 of the actuator body 2 is decreased to the original degree of flexion by depressurizing the fluid 5 by using the pressure source 3 (S3 of FIG. 6). By repeating these steps, the degree of flexion of the actuator body 2 is increased and decreased. The degree of flexion may be increased and decreased in the one direction or may be increased and decreased in a reverse direction. Furthermore, the operation of increasing or decreasing the degree of flexion may be repeated plural times.

Next, a driving mechanism of the actuator body 2 is described.

Figure 7A:
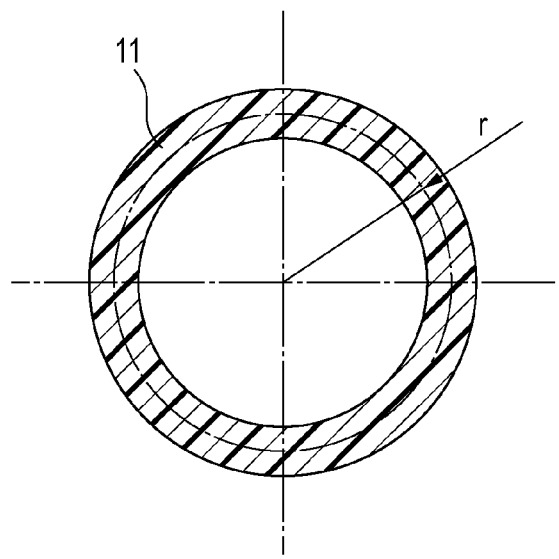
FIG. 7A is a cross-sectional view illustrating a skeletal portion of a first elastic member before application of pressure to fluid in the tube.
Figure 7B:
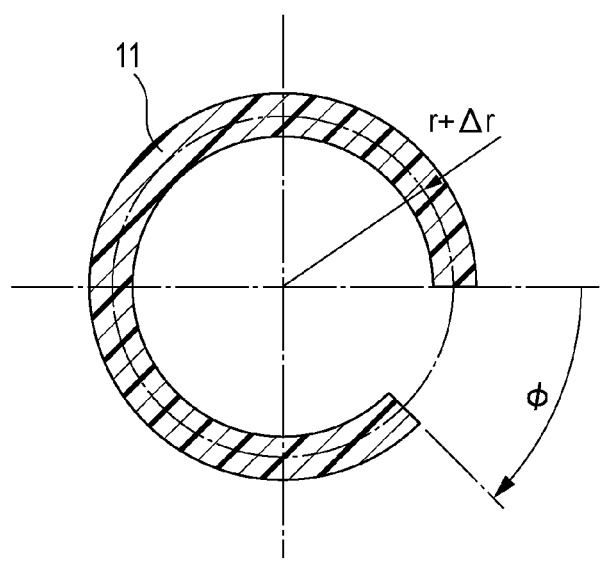
FIG. 7B is a cross-sectional view illustrating deformation of the skeletal portion of the first elastic member after application of pressure to fluid in the tube.

FIG. 7A is a cross-sectional view illustrating a skeletal portion b of the first elastic member 11 before application of pressure to the fluid 5 in the tube 10, and FIG. 7B is a cross-sectional view illustrating deformation of the skeletal portion b of the first elastic member 11 after application of pressure to the fluid 5 in the tube 10.

FIGS. 7A and 7B each illustrate the skeletal portion b in one turn viewed from the direction of the axial center A2.

The skeletal portion b has a radius r before application of pressure to the fluid 5 as illustrated in FIG. 7A. When pressure is applied to the fluid 5, the first elastic member 11 of the tube 10 expands (deforms) in a radial direction due to the pressure transmitted via the second elastic member 12 of the tube 10, and the radius of the skeletal portion b becomes r+Δr accordingly as illustrated in FIG. 7B. At this time, twist of an angle $\varphi=2\pi\Delta r/(r+\Delta r)$ is generated in the skeletal portion b per turn. This twist causes the whole tube 10 mainly constituted by the first elastic member 11 to twist about the axial center A2.

In the present embodiment, since the grooves c of the tube 10 are wound clockwise with respect to the axial center A2 and the actuator body 2 is wound clockwise with respect to the axis A1, the twist generated in the tube 10 acts to contract the actuator body 2 in the direction of the axis A1 as illustrated in FIG. 8B. Since the torsional rigidity of the tube 10 on the left of the axis A1 and the torsional rigidity of the tube 10 on the right of the axis A1 are different from each other, the twist generated in the tube 10 on the left and the twist generated in the tube 10 on the right are also different from each other, and therefore the actuator body 2 flexes toward the left side on which smaller twist is generated.

That is, counterclockwise twist about the axial center A2 is generated in the tube 10 on the whole in accordance with expansion caused by application of the pressure. Since the actuator body 2 is wound clockwise about the axis A1, the tube 10 is twisted counterclockwise on the right side of the actuator body 2 illustrated in FIG. 8B so that a near side of the tube 10 rotates in a direction indicated by the solid-line arrow. Meanwhile, on the left side of the actuator body 2, on which torsional rigidity is higher, the tube 10 is twisted counterclockwise by a smaller amount than on the right side of the actuator body 2 so that a far side of the tube 10 rotates in a direction indicated by the broken-line arrow. Accordingly, the twist generated over the entire length of the tube 10 acts to decrease a pitch angle α of the tube 10 (decrease the spiral pitch p1 of the tube 10). As a result, the actuator body 2 is shortened and flexed due to a difference in amount of change of the pitch angle α between the left and right sides.

Then, when application of the pressure to the fluid 5 is canceled, the radial deformation and twist of the tube 10 return to an original state due to elasticity of the first elastic member 11 and the second elastic member 12, and the length and flexion of the actuator body 2 also return to an original state.

When the tube 10 of the actuator body 2 expands (deforms), the tube 10 also expands (deforms) in the radial direction and in the direction of the axis A2, and the grooves c located on the outer circumferential side of the tube 10 also expands in a width direction thereof. In a case where the inclination θ of the grooves c is less than 45 degrees (the spiral pitch p2 is larger than the outer circumferential length πd of the tube 10) as in the present embodiment, sufficient twist is generated in the tube 10 even in a case where the grooves c spread in the width direction. It is therefore possible to sufficiently contract the actuator body 2.

Next, a case where the actuator body 2 is bent by applying external force from a direction other than a flexion direction is described. The actuator body 2 according to the present embodiment is characterized in that the actuator body 2 can be bent due to elasticity thereof irrespective of pressure of the fluid 5 even in a case where external force is applied from a direction other than the flexion direction.

Figure 10A:
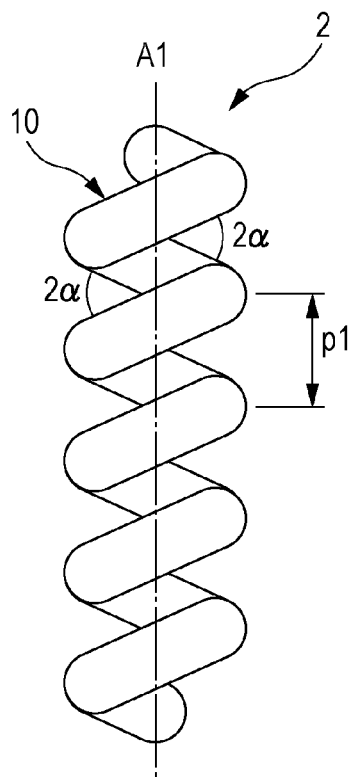
FIG. 10A is a schematic view illustrating the actuator body before application of external force.
Figure 10B:
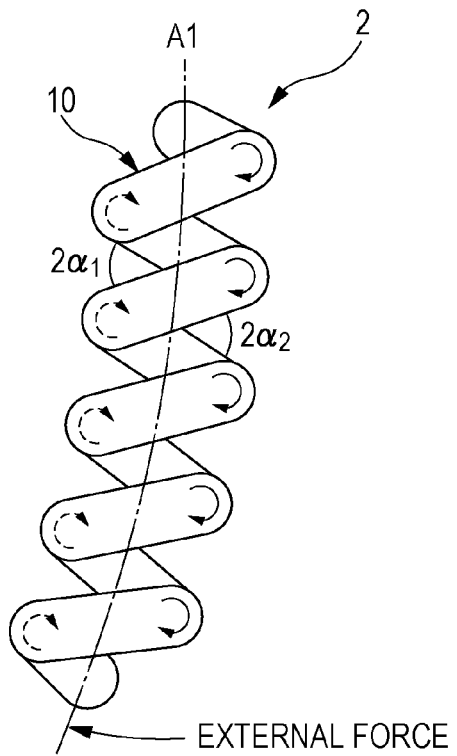
FIG. 10B is a schematic view illustrating a flexion state of the actuator body after application of external force.

FIG. 10A is a schematic view illustrating the actuator body 2 before application of external force from a direction other than the flexion direction, for example, from a direction perpendicular to the flexion direction, and FIG. 10B is a schematic view illustrating a bent state of the actuator body 2 after application of external force from the direction other than the flexion direction. In FIGS. 10A and 10B, illustration of the grooves c is omitted.

Assume that the actuator body 2 is bent by applying external force from a direction other than the flexion direction, for example, from a direction perpendicular to the flexion direction as illustrated in FIG. 10B, the torsional rigidity of the tube 10 on the left of the axis A1 and the torsional rigidity of the tube 10 on the right of the axis A1 in FIG. 10B are equal to each other, one pitch angle α1 of the tube 10 decreases, and the other pitch angle α2 of the tube 10 increases. Accordingly, the right side of the tube 10 is twisted counterclockwise so that a near side of the tube 10 rotates in a direction indicated by the solid-line arrow, and the left side of the tube 10 is twisted clockwise so that a far side of the tube 10 rotates in a direction indicated by the broken-line arrow.

In a case where twist is generated in a direction reverse to the winding direction of the spiral of the grooves c, the diameter of the tube 10 becomes large, and the inner volume of the tube 10 increases. Meanwhile, in a case where twist is generated in the same direction as the winding direction of the spiral of the grooves c, the diameter of the tube 10 becomes small, and the inner volume of the tube 10 decreases. In the present embodiment, since an increase and a decrease in inner volume of the tube 10 concurrently occur, a change in inner volume of the tube 10 is small as a whole, and it is therefore possible to easily bend the actuator body 2.

That is, in a case where the actuator body 2 is bent in a direction other than the flexion direction, rigidity does not almost depend on pressure that acts on the fluid 5, and the rigidity of the actuator body 2 itself is dominant. Therefore, the actuator body 2 that can be easily bent can be achieved by using a flexible material as the actuator body 2.

Next, a method for manufacturing the actuator body 2 is described.

Figure 11:
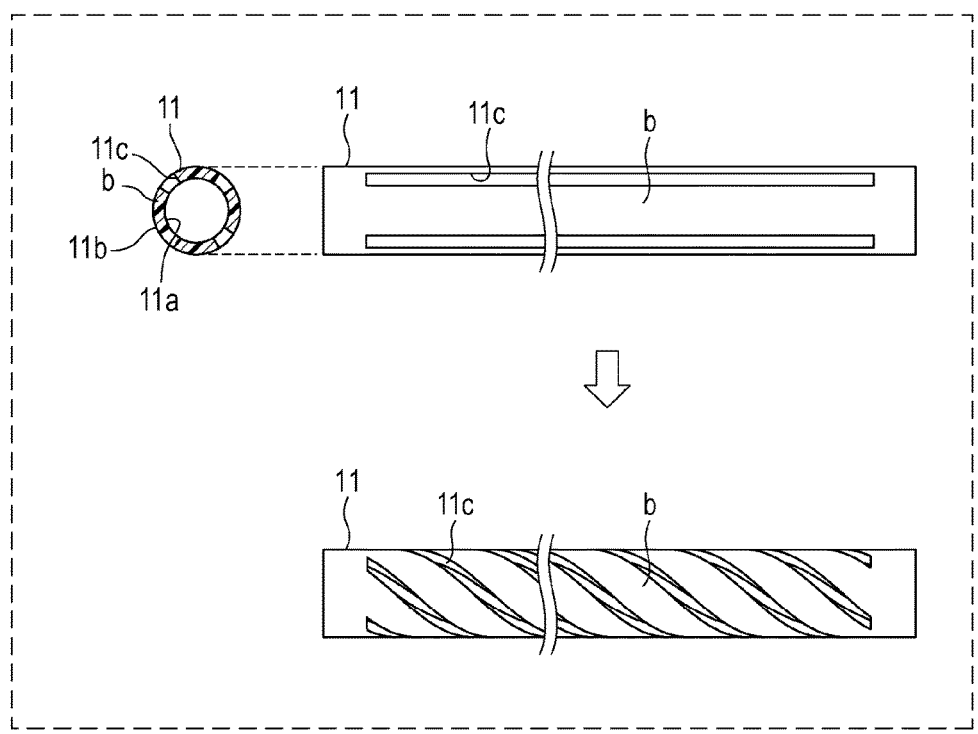
FIG. 11 illustrates a method for manufacturing the first elastic member of the actuator body according to Embodiment 1.

First, as illustrated in FIG. 11, a cylindrical member that has a plurality of skeletal portions b made of a thermoplastic resin is prepared. By partially changing the thickness of the skeletal portions b, torsional rigidity after the processing can be partially increased. Next, this cylindrical member is rotated by being twisted about an axial center while being heated to a glass-transition temperature or higher. Then, the cylindrical member is cooled to form the first elastic member 11 having the plurality of spiral skeletal portions b. Next, the cylindrical second elastic member 12 is inserted into the cylindrical first elastic member 11 to form the linear tube 10. Furthermore, the tube 10 is wound around a core member (not illustrated) while being heated to a glass-transition temperature or higher again. Then, the tube 10 is cooled, and the core member is removed. In this way, the actuator body 2 wound spirally can be prepared.

The first elastic member 11 may be prepared by another manufacturing method. For example, a plurality of skeletal portions b made of a thermoplastic resin are wound spirally around a mandrel serving as a core member and are then subjected to annealing treatment. Then, the first elastic member 11 is obtained by removing the mandrel. Alternatively, the first elastic member 11 may be prepared by a three-dimensional object creating method.

Figure 12:
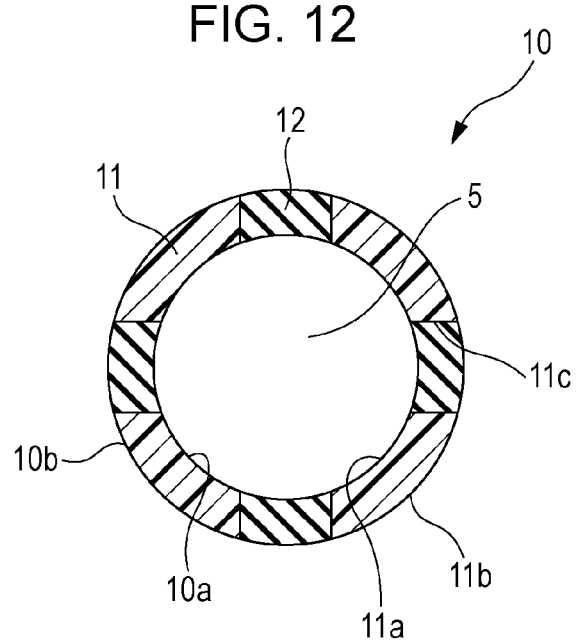
FIG. 12 is a transverse cross-sectional view of a tube of an actuator body according to Modification 1 of Embodiment 1.

Next, modification of the actuator body 2 according to Embodiment 1 is described. The tube 10 of the actuator body 2 may be arranged so that the second elastic member 12 having higher flexibility than the first elastic member 11 is formed so as to fill the through-holes 11c of the cylindrical first elastic member 11 as in Modification 1 illustrated in FIG. 12. That is, the second elastic member 12 may be provided in the through-holes 11c that pass through the inner circumferential surface 11a and the outer circumferential surface 11b of the first elastic member 11. The thickness of the second elastic member 12 and the thickness of the first elastic member 11 are the same as each other, and there is no difference in height between the outer circumferential surface of the second elastic member 12 and the outer circumferential surface 11b of the first elastic member 11. According to this structure, the tube 10 can be made thin. As a result, it is possible to reduce the size of the actuator body 2. The thickness of the second elastic member 12 and the thickness of the first elastic member 11 need not necessarily be the same as each other, and there may be a difference in thickness between the second elastic member 12 and the first elastic member 11.

The configuration of the actuator body 2 according to Modification 1 other than the points described above is similar to that of the actuator body 2 illustrated in FIG. 8A. Specifically, the tube 10 of the actuator body 2 according to Modification 1 is wound spirally. A central axis of the spiral shape is also referred to as a first axis. The through-holes 11c are provided spirally about a longitudinal axis of the tube 10. The first elastic member 11 has a plurality of first portions and a plurality of second portions. Each of the plurality of first portions has higher torsional rigidity than each of the plurality of second portions. The plurality of first portions are aligned along the first axis, and the plurality of second portions do not overlap the plurality of first portions. Also with this structure, it is possible to accomplish similar functions to the tube 10 illustrated in FIG. 3.

As a method for changing torsional rigidity, a thickness of each of the plurality of first portions may be made larger than a thickness of each of the plurality of second portions. According to this configuration, the thickness of each of the first portions is larger than the thickness of each of the second portions, and torsional rigidity of each of the first portions of the tube 10 is made higher in accordance with this increase in thickness. This makes a difference in twist of the tube 10 larger in a case where pressure of fluid is changed, thereby causing the actuator body 2 to more easily flex. Meanwhile, a bending action in a direction other than a flexion direction is not affected, and the actuator body 2 remains easy to bend.

As another method for changing torsional rigidity, a width between through-holes of the plurality of first portions may be made larger than a width between through-holes of the plurality of second portions. According to this configuration, a width between grooves of the first portions is wider than a width between grooves of each of the second portions, and torsional rigidity of each of the first portions of the tube 10 is made larger in accordance with this increase in width. This makes a difference in twist of the tube 10 large in a case where pressure of the fluid is changed, thereby causing the actuator body 2 to more easily flex. Meanwhile, a bending action in a direction other than a flexion direction is not affected, and the actuator body 2 remains easy to bend.

As another method for changing torsional rigidity, a spiral pitch of each of the through-holes of the plurality of first portions may be made larger than a spiral pitch of each of the through-holes of the plurality of second portions. According to this configuration, a spiral pitch of each groove of each of the first portions is larger than a spiral pitch of each groove of each of the second portions, and the number of turns of the spiral decreases and torsional rigidity of each of the first portions of the tube 10 is made higher in accordance with this increase in spiral pitch. This makes a difference in twist of the tube 10 larger in a case where pressure of the fluid is changed, thereby causing the actuator body 2 to more easily flex. Meanwhile, a bending action in a direction other than a flexion direction is not affected; and the actuator body 2 remains easy to bend.

Figure 13:
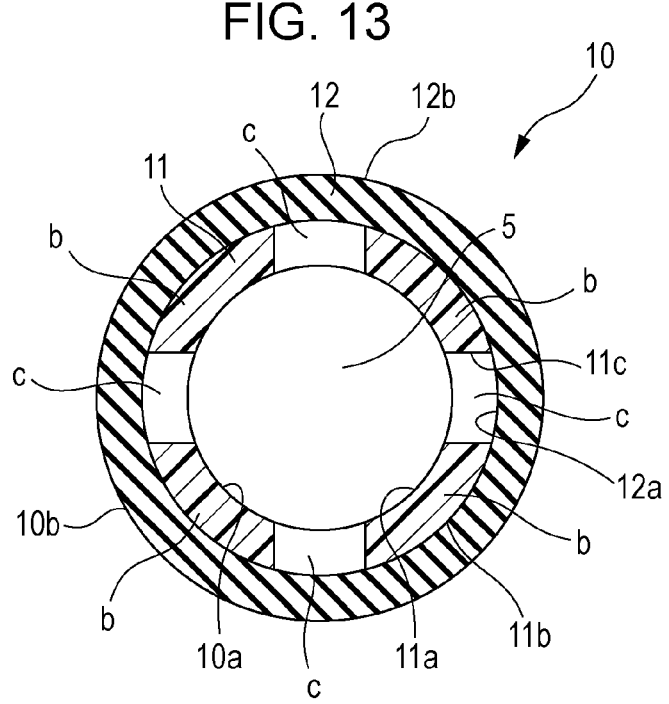
FIG. 13 is a transverse cross-sectional view of a tube of an actuator body according to Modification 2 of Embodiment 1.

The tube 10 of the actuator body 2 may be arranged such that the second elastic member 12 is coupled onto an outside of the first elastic member 11, for example, by adhesion so as to block the through-holes 11c of the first elastic member 11 as in Modification 2 illustrated in FIG. 13. In this case, the grooves c are formed by side surfaces of the through-holes 11c of the first elastic member 11 and the surface (the inner circumferential surface 12a) of the second elastic member 12. Also with this structure, it is possible to accomplish similar functions to the tube 10 illustrated in FIG. 3.

In the above embodiment, a direction of winding of the spiral of the tube 10 and a direction of winding of the spiral of the grooves c are the same as each other but may be reverse to each other. For example, the spiral of the tube 10 may be wound clockwise with respect to the axis A1, and the spiral of the grooves c may be wound counterclockwise with respect to the axial center A2.

In an actuator body (Modification 3, not illustrated) having the above structure, clockwise torsional force is generated in the tube 10 upon application of pressure to the fluid 5 in the tube 10, and this torsional force acts to bent the actuator body 2 while stretching the actuator body 2 in the direction of the axis A1.

Figure 14A:
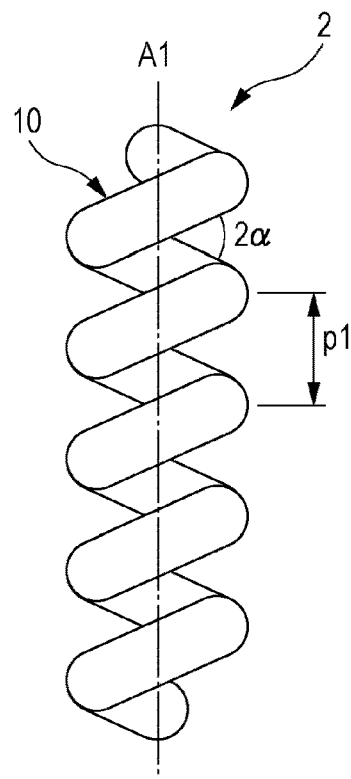
FIG. 14A is a schematic view illustrating an actuator body according to Modification 3 of Embodiment 1 before application of pressure to fluid in a tube.
Figure 14B:
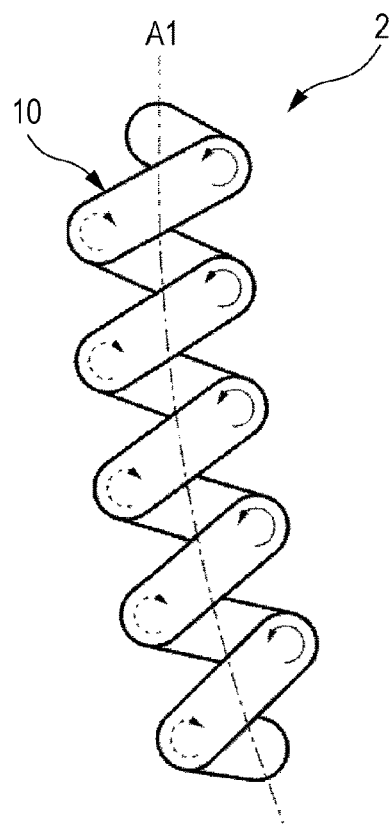
FIG. 14B is a schematic view illustrating flexion of the actuator body according to Modification 3 of Embodiment 1 after application of pressure to fluid in the tube.

FIG. 14A is a schematic view illustrating the actuator body 2 before application of pressure to the fluid 5 in the tube 10, and FIG. 14B is a schematic view illustrating flexion of the actuator body 2 after application of the pressure to the fluid 5 in the tube 10. In FIGS. 14A and 14B, illustration of the grooves c is omitted. The torsional rigidity of the tube 10 according to the modification of the present embodiment is set similar to that in the embodiment illustrated in FIGS. 8A and 9. That is, the torsional rigidity of the tube 10 on the left of the axis A1 in FIG. 14A is set higher. For example, the thickness of the skeletal portions b is higher by 26% and the torsional rigidity is approximately two times higher at a leftmost portion from the axis A1. Furthermore, the torsional rigidity gradually decreases away from this portion and reaches torsional rigidity that is not different from other portions at the position of ±45 degrees when viewed from the direction of the axis A1.

In this actuator body 2, the spiral of the grooves c is wound counterclockwise, and therefore clockwise twist about the axial center A2 of the tube 10 is generated in the whole tube 10 in accordance with expansion caused by application of pressure. Since the tube 10 is wound clockwise about the axis A1, the tube 10 on the right side of the actuator body 2 illustrated in FIG. 14B is twisted clockwise so that a near side of the tube 10 rotates in a direction indicated by the solid-line arrow. Meanwhile, on the left side of the actuator body 2, on which torsional rigidity is higher, the tube 10 is twisted clockwise by a smaller amount than on the right side of the actuator body 2 so that a far side of the tube 10 rotates in a direction of the broken-line arrow. Accordingly, twist generated over the entire length of the tube 10 acts to increase a pitch angle α of the tube 10 (increase a spiral angle p1 of the tube 10). As a result, the actuator body 2 is prolonged and is bent due to a difference in the amount of change of the pitch angle α between the left and right.

That is, by making a direction of winding of the spiral of the tube 10 reverse to a direction of winding of the spiral of the grooves c, it is possible to bend the actuator body 2 while stretching the actuator body 2. The same applies to a case where the tube 10 is wound counterclockwise about the axis A1.

Embodiment 2

An actuator body according to Embodiment 2 is different from that according to Embodiment 1 in that a first elastic member 11 and a second elastic member 12 are integrated with each other.

Figure 15:
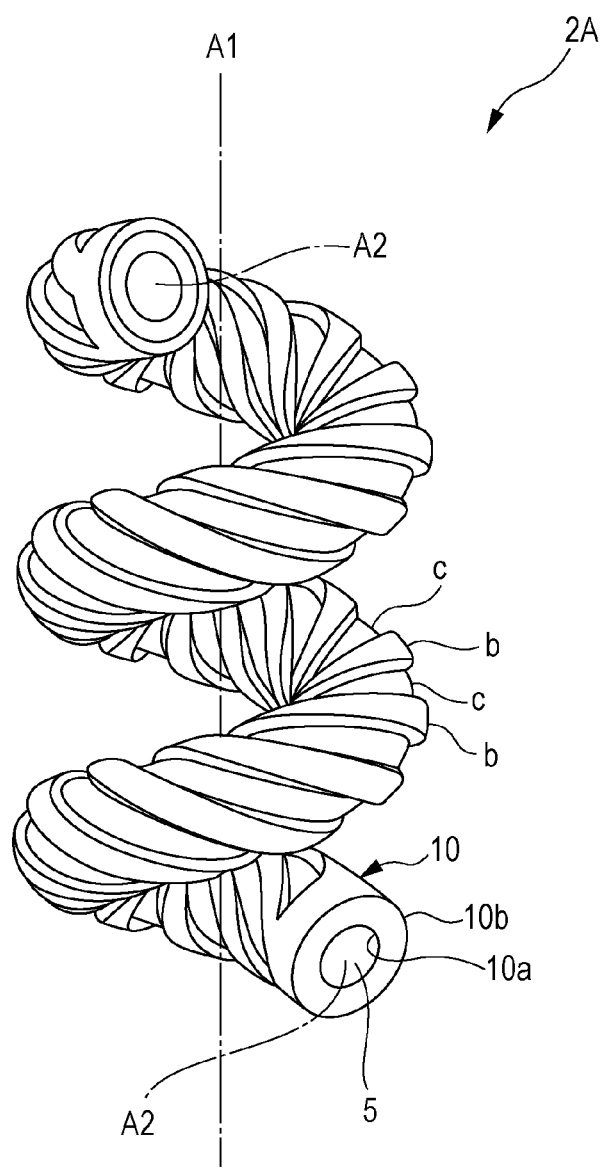
FIG. 15 illustrates part of a tube of an actuator body according to Embodiment 2.
Figure 16:
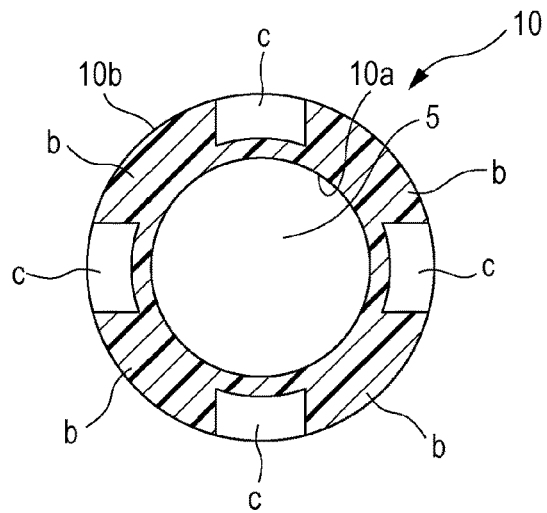
FIG. 16 is a transverse cross-sectional view of the tube of the actuator body according to Embodiment 2.

FIG. 15 illustrates part of a tube 10 of an actuator body 2A, and FIG. 16 is a transverse cross-sectional view of the tube 10 of the actuator body 2A. In the following drawings, elements that are similar to those in Embodiment 1 are given similar reference signs, and description thereof is omitted.

The actuator body 2A is shaped so that the hollow tube 10 having elasticity is wound spirally. The tube 10 is wound about an axis A1 of the actuator body 2A. In an outer circumferential surface 10b of the tube 10, grooves c are provided spirally about an axial center A2 of the tube 10.

The grooves c of the tube 10 are multiple grooves, and a width thereof is constant. A depth of each of the grooves c is equal to or larger than a half of the thickness of the tube 10. That is, a portion having a groove c is more flexible than a portion having no groove c. A spiral pitch p2 of each of the grooves c is larger than an outer circumferential length πd of the tube 10.

The tube 10 is hollow, and this hollow part is filled with fluid 5. The tube 10 has a plurality of skeletal portions b each located between grooves c that are adjacent in a circumferential direction. The skeletal portions b are provided so as to be provided apart from one another in the circumferential direction. The skeletal portions b are four skeletal portions b1, b2, b3, and b4. The tube 10 is, for example, made of nylon.

Figure 9C:
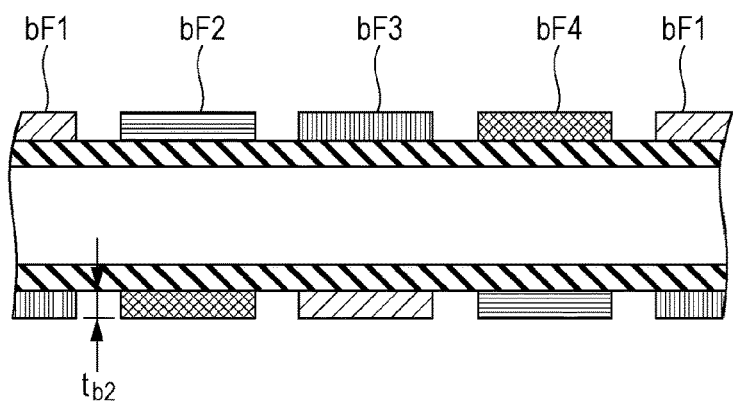
FIG. 9C is a longitudinal cross-sectional view illustrating a thickness of the skeletal portions of the tube at a first portion in FIG. 8A.

The thickness of the skeletal portions b of the tube 10 is not uniform as in Embodiment 1 illustrated in FIGS. 8A and 9, and a first portion is thicker than a second portion, for example, by approximately 26%, and torsional rigidity of the first portion is higher than that of the second portion accordingly. This produces an effect similar to Embodiment 1, and the actuator body 2A makes a flexion action in accordance with expansion caused by application of pressure.

In the actuator body 2A according to Embodiment 2, the tube 10 is an integral member, and therefore the actuator body 2A can have a simple structure. This actuator body 2A also produces similar effects to the actuator body 2 according to Embodiment 1.

Modifications of the actuator body 2A according to Embodiment 2 are described below.

Figure 17:
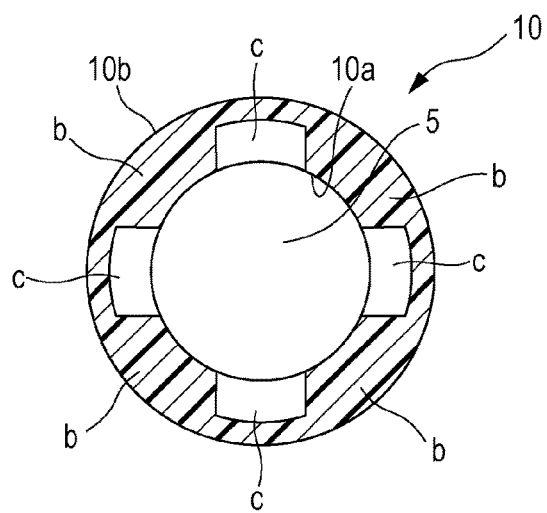
FIG. 17 is a transverse cross-sectional view of a tube of an actuator body according to Modification 4 of Embodiment 2.
Figure 18:
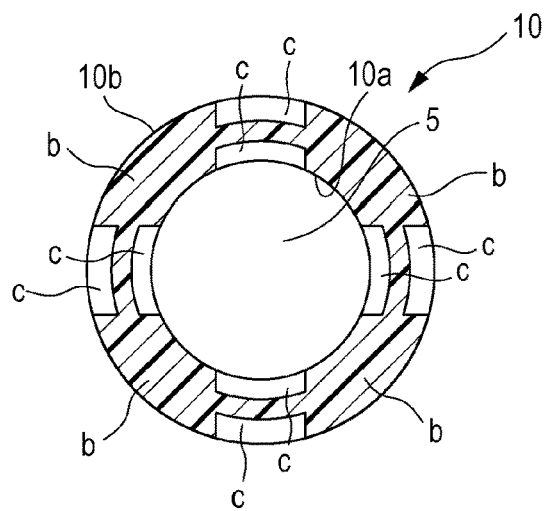
FIG. 18 is a transverse cross-sectional view of a tube of an actuator body according to Modification 5 of Embodiment 2.
Figure 21:
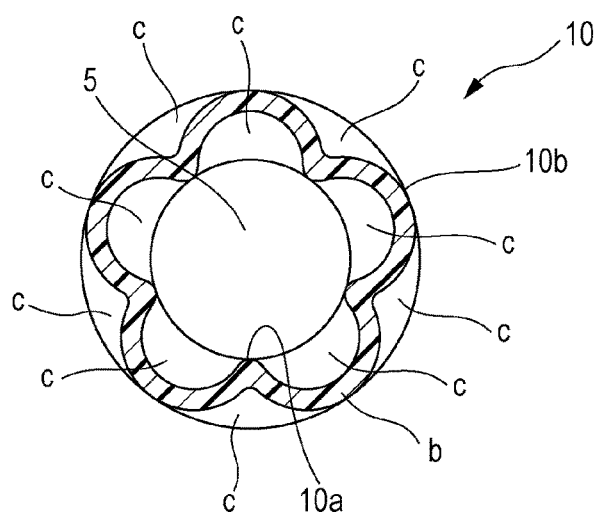
FIG. 21 is a transverse cross-sectional view of a tube of an actuator body according to Modification 6 of Embodiment 2.

The tube 10 of the actuator body 2A may be arranged such that the grooves c are provided in an inner circumferential surface 10a of the tube 10 as in Modification 4 illustrated in FIG. 17. Alternatively, the grooves c may be provided both in the inner circumferential surface 10a and in the outer circumferential surface 10b of the tube 10 as in Modification 5 illustrated in FIG. 18, Alternatively, the grooves c may be provided alternately in the inner circumferential surface 10a and the outer circumferential surface 10b of the tube 10 as in Modification 6 illustrated in FIG. 21. According to these structures, it is also possible to accomplish functions similar to the tube 10 illustrated in FIG. 16. In Modification 5, the grooves c in the inner circumferential surface 10a and the grooves c in the outer circumferential surface 10b are provided at the same positions, but the positions of the grooves c are not limited to this. The grooves c in the inner circumferential surface 10a and the grooves c in the outer circumferential surface 10b may be provided at different positions.

Embodiment 3

An actuator body according to Embodiment 3 is different from that according to Embodiment 1 in that a single groove c is provided.

Figure 19:
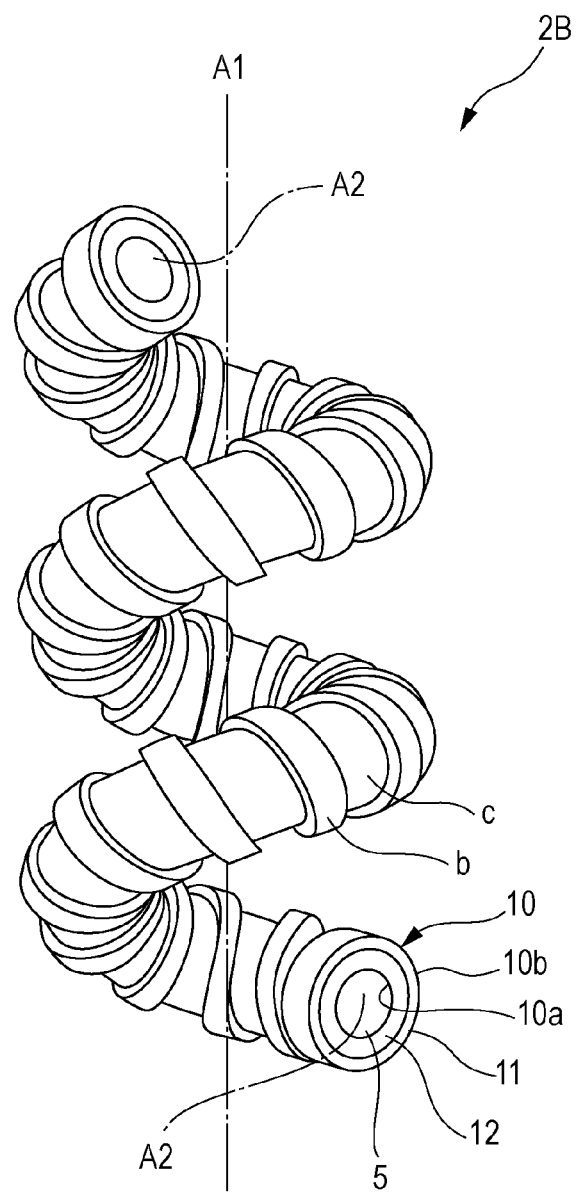
FIG. 19 illustrates part of a tube of an actuator body according to Embodiment 3.

FIG. 19 illustrates part of a tube 10 of an actuator body 2B according to Embodiment 3.

The actuator body 2B is also shaped so that the hollow tube 10 having elasticity is wound spirally. The tube 10 is wound about an axis A1 of the actuator body 2B. In an outer circumferential surface 10b of the tube 10, a single groove c is provided spirally about an axial center A2 of the tube 10.

Specifically, the tube 10 includes a cylindrical first elastic member 11 and a cylindrical second elastic member 12 that is more flexible than the first elastic member 11. The first elastic member 11 has a single through-hole 11c that passes through an inner circumferential surface 11a and an outer circumferential surface 11b. The second elastic member 12 is disposed in contact with an inner side of the first elastic member 11 and blocks the through-hole 11c. The first elastic member 11 has a single skeletal portion b having an arc-like cross section. This skeletal portion b is wound spirally about the axial center A2, so that the single groove c is provided spirally. The thickness of the skeletal portions b is not uniform as in Embodiment 1 illustrated in FIGS. 8A and 9, and a first portion is thicker than a second portion, for example, by approximately 26%, and torsional rigidity of the first portion is higher than that of the second portion accordingly. This produces an effect similar to Embodiment 1, and the actuator body 2B makes a flexion action in accordance with expansion caused by application of pressure.

Next, a method for manufacturing the actuator body 2B is described.

Figure 20:
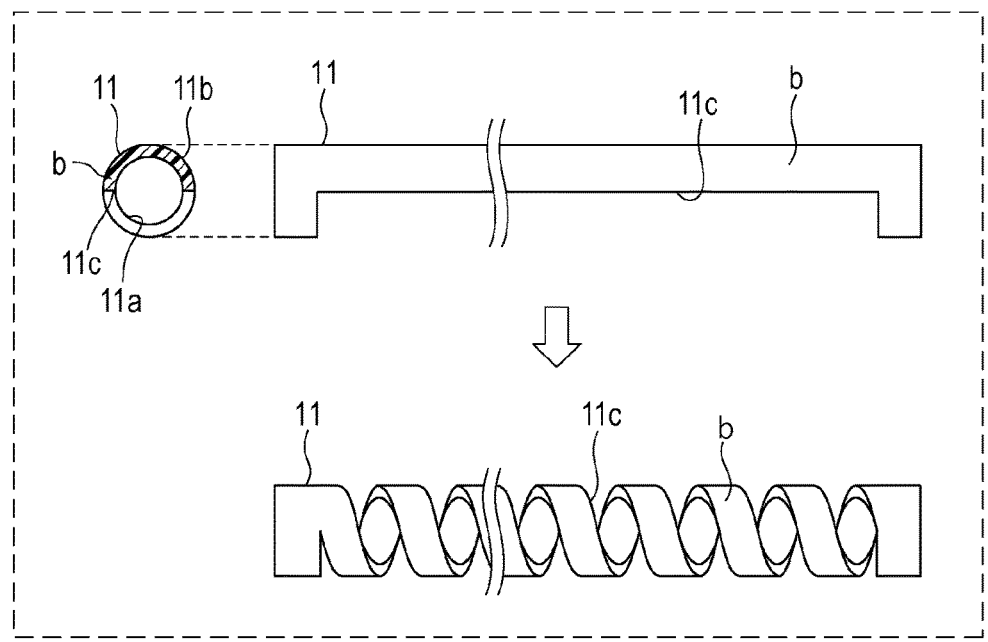
FIG. 20 illustrates a method for manufacturing a first elastic member of the actuator body according to Embodiment 3.

First, as illustrated in FIG. 20, a cylindrical member that has a single skeletal portion b made of a thermoplastic resin is prepared. By partially changing the thickness of the skeletal portion b, torsional rigidity after the processing can be partially increased. Next, this cylindrical member is rotated by being twisted about an axial center while being heated to a glass-transition temperature or higher. Then, the cylindrical member is cooled to form the first elastic member 11 having the spiral skeletal portion b. Next, the cylindrical second elastic member 12 is inserted into the cylindrical first elastic member 11 to form the linear tube 10. Furthermore, the tube 10 is wound around a core member while being heated to a glass-transition temperature or higher again. Then, the tube 10 is cooled, and the core member is removed. In this way, the actuator body 2B wound spirally can be prepared.

The first elastic member 11 may be prepared by another manufacturing method. For example, a single skeletal portion b made of a thermoplastic resin is wound spirally around a mandrel serving as a core member and is then subjected to annealing treatment. Then, the first elastic member 11 is obtained by removing the mandrel. Alternatively, the first elastic member 11 may be prepared by a three-dimensional object creating method.

This actuator body 2B also produces effects equivalent to those produced by the actuator body 2 according to Embodiment 1.

An actuator body according to one or more aspects has been described above on the basis of the embodiments, but the present disclosure is not limited to these embodiments. Various modifications of the embodiments which a person skilled in the art can think of and combinations of constituent elements in different embodiments may be also encompassed within the one or more aspects without departing from the scope of the present disclosure.

For example, in the embodiments described above, water is used as fluid. However, the present disclosure is not limited to this. Any known liquid can be used as fluid. Furthermore, the fluid is not limited to a liquid and can be any of various kinds of gas that is compressible fluid.

In the above embodiments, a spiral groove has a constant width. However, the present disclosure is not limited to this. The width of the groove may change in a longitudinal direction and/or in a thickness direction of the groove. Furthermore, the spiral groove need not be a single continuous groove as in the above embodiments but may be divided at some positions.

In the above embodiments, the thickness of the skeletal portion b is changed in order to increase torsional rigidity. However, the present disclosure is not limited to this. A width between grooves c, i.e., the width of the skeletal portion b may be partially increased.

Figure 22A:
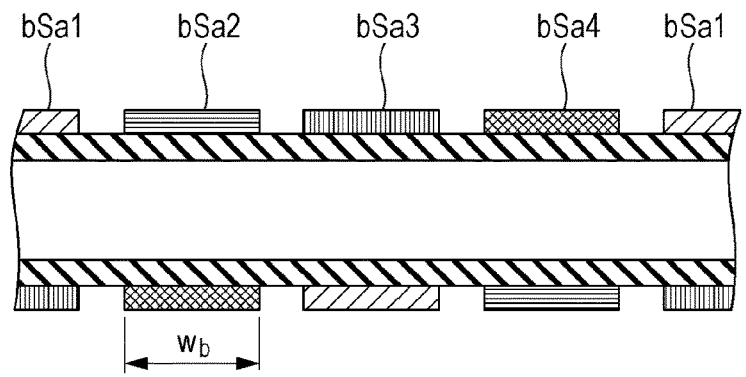
FIG. 22A is a longitudinal cross-sectional view illustrating a width of skeletal portions of the tube in a second portion in FIG. 8A.
Figure 22B:
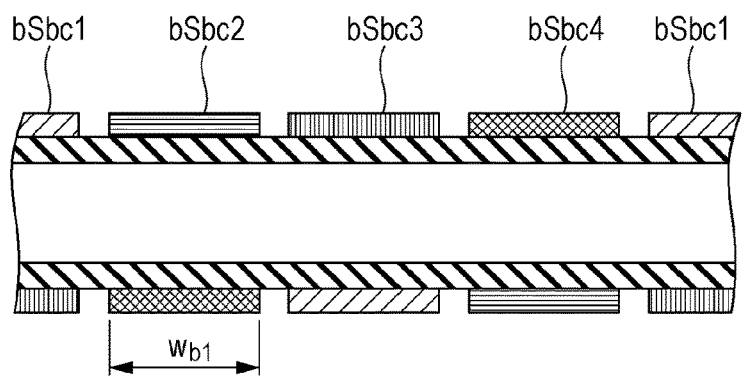
FIG. 22B is a longitudinal cross-sectional view illustrating a width of the skeletal portions of the tube at other second portions in FIG. 8A.
Figure 22C:
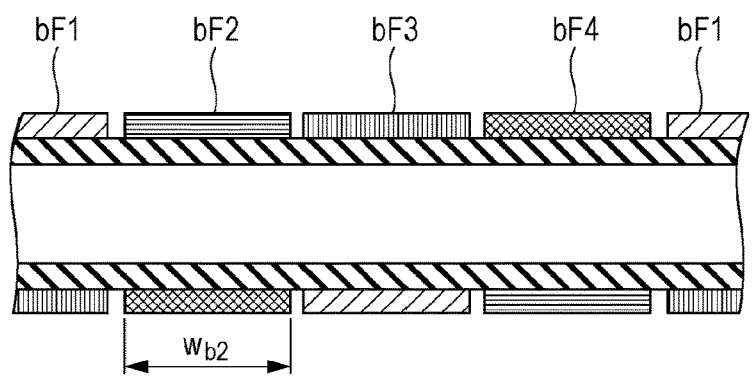
FIG. 22C is a longitudinal cross-sectional view illustrating a width of the skeletal portions of the tube at a first portion in FIG. 8A.

FIG. 22A is a longitudinal cross-sectional view illustrating a width of skeletal portions of a tube at the second portion Sa1 in FIG. 8A. FIG. 22B is a longitudinal cross-sectional view illustrating a width of the skeletal portions of the tube at the second portions Sb1 and Sc1 in FIG. 8A. FIG. 22C is a longitudinal cross-sectional view illustrating a width of the skeletal portions of the tube at the first portion F1 in FIG. 8A.

For example, the torsional rigidity can be made higher at the first portion F1 than at the second portion Sa1, Sb1, and Sc1 by making a width $w_{b1}$ of skeletal portions bSbc1, bSbc2, bSbc3, and bSbc4 at the second portions Sb1 and Sc1 illustrated in FIG. 22B larger by 11% and making a width $w_{b2}$ of skeletal portion bF1, bF2, bF3, and bF4 at the first portion F1 illustrated in FIG. 22C larger by 22% than a width $w_b$ of skeletal portions bSa1, bSa2, bSa3, and bSa4 at the second portion Sa1 illustrated in 22A. Widths of the skeletal portions b of each turn of the spiral of the tube 10 can be similar to those of the first portion F1 and the second portions Sa1, Sb1, and Sc1.

The width of the skeletal portions b may be changed in any ways. The width of the skeletal portions b may be linearly changed or may be changed sinusoidally. The width $w_{b1}$ of the skeletal portions bSbc1, bSbc2, bSbc3, and bSbc4 at the second portions Sb1 and Sc1 may be made the same as the width $w_b$ of the second portion Sa1, and the width may be changed between the second portions Sb1 and Sc1 and the second portion Sa1.

As a method for changing torsional rigidity, a spiral pitch of each groove c may be partially increased.

Figure 23A:
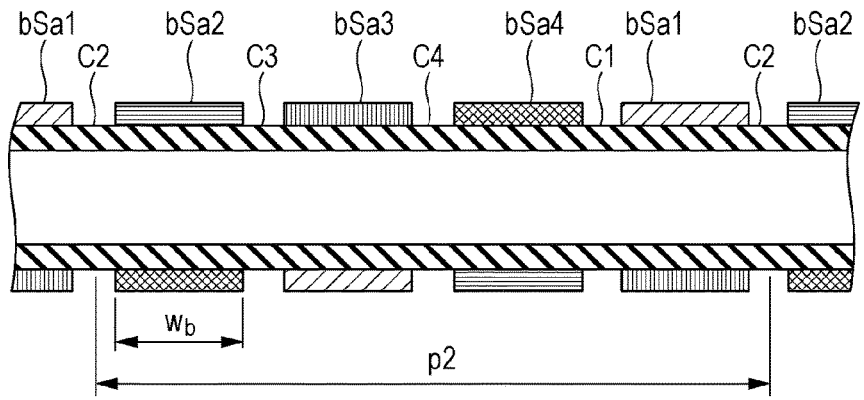
FIG. 23A is a longitudinal cross-sectional view illustrating a spiral pitch of a groove of the tube at a second portion in FIG. 8A.
Figure 23B:
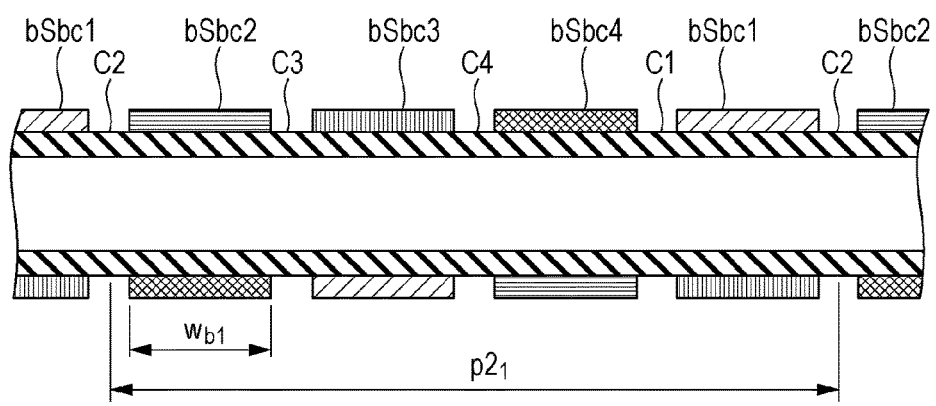
FIG. 23B is a longitudinal cross-sectional view illustrating a spiral pitch of a groove of the tube at other second portions in FIG. 8A.

FIG. 23A is a longitudinal cross-sectional view illustrating a spiral pitch of each groove of a tube at the second portion Sa1 in FIG. 8A. FIG. 23B is a longitudinal cross-sectional view illustrating a spiral pitch of each groove of the tube at the second portions Sb1 and Sc1 in FIG. 8A, FIG. 23C is a longitudinal cross-sectional view illustrating a spiral pitch of each groove of the tube at the first portion F1 in FIG. 8A.

Figure 23C:
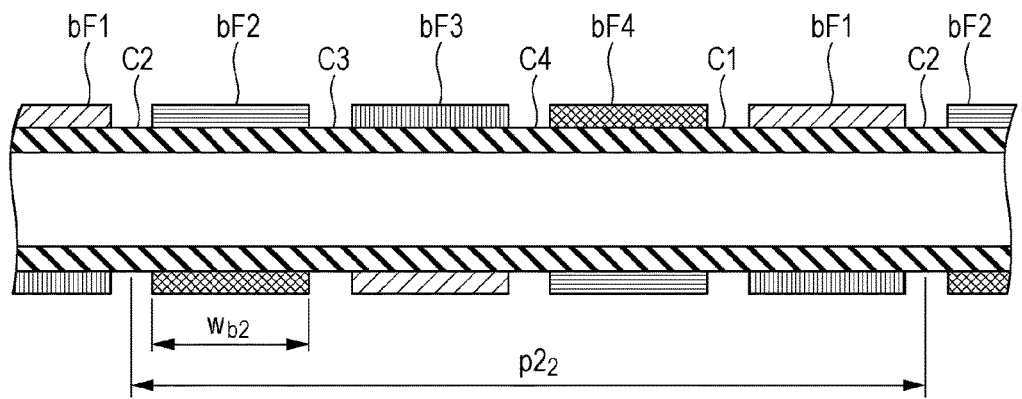
FIG. 23C is a longitudinal cross-sectional view illustrating a spiral pitch of a groove of the tube at a first portion in FIG. 8A.

For example, the torsional rigidity can be made higher at the first portion F1 than at the second portion Sa1, Sb1, and Sc1 by making a spiral pitch $p2_1$ of each of the grooves c at the second portions Sb1 and Sc1 illustrated in FIG. 23B larger by 8% and making a spiral pitch $p2_2$ of each of the grooves c at the first portion F1 illustrated in FIG. 23C larger by 16% than a spiral pitch p2 of each of the grooves c at the second portion Sa1 illustrated in 23A. Spiral pitches of each of the grooves c of each turn of the spiral of the tube 10 can be similar to those of the first portion F1 and the second portions Sa1, Sb1, and Sc1.

The spiral pitch of each of the grooves c may be changed in any ways. The spiral pitch of each of the grooves c may be linearly changed or may be changed sinusoidally. The spiral pitch $p2_1$ of each of the grooves c at the second portions Sb1 and Sc1 may be made the same as the spiral pitch p2 of each of the grooves c at the second portion Sa1, and the spiral pitch may be changed between the second portions Sb1 and Sc1 and the second portion Sa1, In FIGS. 23A, 23B, and 23C, the width of the skeletal portions b is also changed in order to keep the width of the grooves c. This also produces the aforementioned effect obtained from a change in width of the skeletal portions b. However, the present disclosure is not limited to this, and the width of the skeletal portions b may be kept constant.

As a method for changing torsional rigidity, a material itself of the skeletal portions b may be changed, for example, by chemical reforming. Furthermore, instead of changing the dimension of the skeletal portions b themselves, torsional rigidity may be changed by bringing another member into close contact with the skeletal portions b.

In the above embodiments, torsional rigidity is uniformly increased in the same direction so that an actuator body is flexed in a single direction on the whole. However, the present disclosure is not limited to this. A direction in which torsional rigidity is increased and/or a degree of improvement in torsional rigidity may be different from one portion to another of the actuator body so that the actuator body is flexed in various directions and/or at various degrees of flexion at respective portions. For example, in a case where actuators of the subject application are disposed along fingers in a glove-like assist wear, a glove-like assist wear that fits finger movement better is obtained by causing the actuators to flex close to joints of the fingers.

In the above embodiments, a syringe pump is used as a pressure source. However, the present disclosure is not limited to this. Any known techniques and combinations thereof can be used as long as a pressure source that allows fluid to flow into and out of an inner space is used.

In the above embodiments, water flows out of and into one end of a coil member whose other end is sealed. However, the present disclosure is not limited to this. Water may also flow out of and into the other end. Furthermore, a water outlet/inlet may be provided somewhere in the middle of the coil member. It is possible to increase response of the actuator by increasing the number of water outlets/inlets.

Furthermore, a gripping hand including a plurality of actuator bodies according to any of the above embodiments is capable of gripping an object because of flexion action of the actuator bodies corresponding to fingers.

An actuator body according to an aspect of the present disclosure can be used as an artificial muscle actuator for driving a machine that works close to humans and is applicable to the field of a wearable assist machine like a cloth. In addition, an actuator body according to an aspect of the present disclosure can be used as a linear actuator that has flexibility against external force and as a light-weight linear actuator.

What is claimed is:
1. An actuator body comprising:
   a tube that has a space therein and is wound spirally about a first axis;
   wherein the tube has a plurality of first portions and a plurality of second portions,
   wherein the tube has one or more grooves in at east one of an outer circumferential surface and an inner circumferential surface thereof, and the one or more grooves are provided spirally about a longitudinal axis of the tube,
   wherein the space is in contact with the inner circumferential surface, and the outer circumferential surface is a surface opposite to the inner circumferential surface,
   wherein each of the plurality of first portions has higher torsional rigidity than each of the plurality of second portions,
   wherein the plurality of first portions are aligned along the first axis, and
   wherein the plurality of first portions do not overlap the plurality of second portions.
2. The actuator body according to claim 1, wherein
   the tube includes a cylindrical first elastic member and a cylindrical second elastic member that is disposed on an inner side or an outer side of the first elastic member and that is more flexible than the first elastic member;
   the one or more grooves are formed by a through-hole that passes through an inner circumferential surface of the first elastic member and an outer circumferential surface of the first elastic member and part of a surface of the second elastic member; and
   the through-hole forms a first opening in the inner circumferential surface and a second opening in the outer circumferential surface, and the part of the surface blocks the first opening or the second opening.
3. The actuator body according to claim 2, wherein
   the first elastic member has a spiral skeletal portion located between adjacent two of the grooves that are adjacent to each other in a circumferential direction of the first elastic member; and
   a thickness of the skeletal portion is smaller than a width of the skeletal portion.
4. The actuator body according to claim 2, wherein
   a spiral pitch of the one or more grooves is larger than an outer circumferential length of the first elastic member.
5. The actuator body according to claim 2, wherein
   the first elastic member is located on an outer side of the second elastic member, and an edge line formed by the inner circumferential surface of the first elastic member and a side surface of the through-hole is chamfered; and
   the side surface is included in the first elastic member and is located between the first opening and the second opening.
6. The actuator body according to claim 2, wherein
   a distance between the first opening and the second opening is equal to or larger than a half of a thickness of the tube.
7. The actuator body according to claim 1, wherein
   a spiral pitch of the one or more grooves is larger than an outer circumferential length of the tube.
8. The actuator body according to claim 1, wherein
   the one or more grooves are multiple grooves.
9. The actuator body according to claim 1, wherein
   each of the one or more grooves has a constant width.
10. An actuator body comprising:
    a tube that has a space therein and is wound spirally about a first axis;
    wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein a thickness of the tube at each of the plurality of first portions is larger than a thickness of the tube at each of the plurality of second portions, wherein the plurality of first portions are aligned along the first axis, and wherein the plurality of first portions do not overlap the plurality of second portions.

11. An actuator body comprising:

a tube that has a space therein and is wound spirally about a first axis;

wherein the tube has a plurality of first portions and a plurality of second portions;

wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein a width between the grooves at each of the plurality of first portions is larger than a width between the grooves at each of the plurality of second portions, wherein the plurality of first portions are aligned along the first axis, and wherein the plurality of first portions do not overlap the plurality of second portions.

12. An actuator body comprising:

a tube that has a space therein and is wound spirally about a first axis;

wherein the tube has a plurality of first portions and a plurality of second portions;

wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein a spiral pitch of the one or more grooves in each of the plurality of first portions larger than a spiral pitch of the one or more grooves in each of the plurality of second portions, wherein the plurality of first portions are aligned along the first axis, and wherein the plurality of first portions do not overlap the plurality of second portions.

13. An actuator body comprising:

a tube that has a space therein and is wound spirally about a first axis;

wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about a longitudinal axis of the tube, wherein the space is in contact with the inner circumferential surface, and the outer circumferential surface is a surface opposite to the inner circumferential surface, wherein the second elastic member is provided in the one or more through-holes, wherein each of the plurality of first portions has higher torsional rigidity than each of the plurality of second portions, wherein the plurality of first portions are aligned along the first axis, and wherein the plurality of first portions do not overlap the plurality of second portions.

14. An actuator body comprising:

a tube that has a space therein and is wound spirally about a first axis;

wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about a longitudinal axis of the tube, wherein the space is in contact with the inner circumferential surface, and the outer circumferential surface is a surface opposite to the inner circumferential surface, wherein the second elastic member is provided in the one or more through-holes, wherein a thickness of the tube at each of the plurality of first portions is larger than a thickness of the tube at each of the plurality of second portions, wherein the plurality of first portions are aligned along the first axis, and wherein the plurality of first portions do not overlap the plurality of second portions.

15. An actuator body comprising:

a tube that has a space therein and is wound spirally about a first axis;

wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about a longitudinal axis of the tube, wherein the space is in contact with the inner circumferential surface, and the outer circumferential surface is a surface opposite to the inner circumferential surface, wherein the second elastic member is provided in the one or more through-holes, wherein a width between the one or more through-holes at each of the plurality of first portions is larger than a width between the one or more through-holes at each of the plurality of second portions, wherein the plurality of first portions are aligned along the first axis, and wherein the plurality of first portions do not overlap the plurality of second portions.

16. An actuator body comprising:

a tube that has a space therein and is wound spirally about a first axis;

wherein the tube includes a cylindrical first elastic member and a second elastic member that is more flexible than the first elastic member, wherein the first elastic member has a plurality of first portions and a plurality of second portions, wherein each of the plurality of first portions and each of the plurality of second portions has one or more through-holes that pass through an inner circumferential surface and an outer circumferential surface thereof, wherein the one or more through-holes are provided spirally about an axial center of the tube, wherein the space is in contact with the inner circumferential surface, and the outer circumferential surface is a surface opposite to the inner circumferential surface, wherein the second elastic member is provided in the one or more through-holes, wherein a spiral pitch of the one or more through-holes at each of the plurality of first portions is larger than a spiral pitch of the one or more through-holes at each of the plurality of second portions, wherein the plurality of first portions are aligned along the first axis, and wherein the plurality of first portions do not overlap the plurality of second portions.

17. A method for controlling an actuator body, comprising:

receiving, by a controller, an instruction signal; and increasing or decreasing, by the controller, pressure of fluid in accordance with the instruction signal, the actuator body including a tube that has a space therein and is wound spirally about a first axis;

wherein the tube has a plurality of first portions and a plurality of second portions, wherein the tube has one or more grooves in at east one of an outer circumferential surface and an inner circumferential surface thereof, wherein the one or more grooves are provided spirally about a longitudinal axis of the tube, wherein the space is in contact with the inner circumferential surface, and the outer circumferential surface is a surface opposite to the inner circumferential surface, wherein each of the plurality of first portions has higher torsional rigidity than each of the plurality of second portions, wherein the plurality of first portions are aligned along the first axis, wherein the plurality of first portions do not overlap the plurality of second portions, and wherein the tube is filled with the fluid.

18. A gripping hand comprising a plurality of actuator bodies, each of the plurality of actuator bodies including a tube that has a space therein and is wound spirally about a first axis;

wherein the tube has a plurality of first portions and a plurality of second portions, wherein the tube has one or more grooves in at least one of an outer circumferential surface and an inner circumferential surface thereof, and the one or more grooves are provided spirally about a longitudinal axis of the tube, wherein the space is in contact with the inner circumferential surface, and the outer circumferential surface is a surface opposite to the inner circumferential surface, wherein each of the plurality of first portions has higher torsional rigidity than each of the plurality of second portions, wherein the plurality of first portions are aligned along the first axis, wherein the plurality of first portions do not overlap the plurality of second portions, and wherein the gripping hand uses the plurality of actuator bodies as gripping tools.

* * * * *